United States Patent
Haas et al.

(10) Patent No.: US 7,867,458 B2
(45) Date of Patent: Jan. 11, 2011

(54) DEVICE AND METHOD FOR PRESSURE AND FLOW CONTROL IN PARALLEL REACTORS

(75) Inventors: Alfred Haas, Eppelheim (DE);
Wolfgang Strehlau, Dossenheim (DE);
Armin Brenner, Eppelheim (DE);
Oliver Koechel, Bubenheim (DE);
Markus Friess, Lindenberg (DE);
Torsten Zech, Heidelberg (DE)

(73) Assignee: HTE Aktiengesellschaft The High Throughtput Experimentation Company, Heidelberg (DE)

( * ) Notice: Subject to any disclaimer, the term of this patent is extended or adjusted under 35 U.S.C. 154(b) by 0 days.

(21) Appl. No.: 12/424,744

(22) Filed: Apr. 16, 2009

(65) Prior Publication Data
US 2009/0258431 A1 Oct. 15, 2009

Related U.S. Application Data

(62) Division of application No. 10/583,753, filed as application No. PCT/EP2004/014509 on Dec. 20, 2004, now Pat. No. 7,537,739.

(30) Foreign Application Priority Data
Dec. 23, 2003 (DE) ................. 103 61 003

(51) Int. Cl.
*B01J 19/00* (2006.01)
*G01N 25/08* (2006.01)
*G05D 7/00* (2006.01)
*G05B 21/00* (2006.01)

(52) U.S. Cl. ............... 422/196; 422/110; 422/127; 422/129; 422/130; 422/131; 436/149; 700/266

(58) Field of Classification Search ............ 422/127, 422/130, 131, 129, 196, 110; 436/149, 164; 518/700; 700/266; 208/107, 133, 142, 209, 208/254 H
See application file for complete search history.

(56) References Cited

U.S. PATENT DOCUMENTS
2,583,177 A    1/1952    Hoekstra
(Continued)

FOREIGN PATENT DOCUMENTS
DE    234941    4/1986
(Continued)

OTHER PUBLICATIONS
Machine translation of JP 09-296272 A, which was published Nov. 1997.*
(Continued)

*Primary Examiner*—Walter D Griffin
*Assistant Examiner*—Natasha Young
(74) *Attorney, Agent, or Firm*—Choate, Hall & Stewart, LLP; Andrea L. C. Robidoux

(57) ABSTRACT

The present invention relates to a method and a device for the parallel study of chemical reactions in at least two spatially separated reaction spaces. In particular, the invention is suitable for reactions which are not constant volume reactions and/or for reactions in which fluid flows through at least two spatially separated reaction spaces are intended to be controlled together for all the reaction spaces, or for related subsets of them, in the most straightforward way possible.

According to one embodiment, the device according to the invention for the parallel study of chemical reactions comprises at least the following components: (a) at least two spatially separated reaction spaces; (b) on the reaction space input side, at least one common educt feed for the reaction spaces according to (a); (d) on the reaction space output side, at least one connection per reaction space to at least one holding gas feed common to all the reaction spaces, or subsets of them; (e) on the reaction space output side, and downstream of the connection to the holding gas feed according to (d) in the product flow direction, at least one restrictor per reaction space.

13 Claims, 8 Drawing Sheets

U.S. PATENT DOCUMENTS

| | | | |
|---|---|---|---|
| 2,676,603 | A | 4/1954 | Kollsman |
| 3,853,144 | A | 12/1974 | Whelan |
| 4,388,411 | A | 6/1983 | Lovelock |
| 4,880,449 | A | 11/1989 | Babyak et al. |
| 5,304,354 | A | 4/1994 | Finley et al. |
| 5,503,805 | A | 4/1996 | Sugarman et al. |
| 6,149,882 | A | 11/2000 | Guan et al. |
| 6,395,552 | B1 | 5/2002 | Borade et al. |
| 6,443,170 | B1 | 9/2002 | Vansant et al. |
| 6,489,168 | B1 | 12/2002 | Wang et al. |
| 6,528,026 | B2 | 3/2003 | Hajduk et al. |
| 6,623,703 | B1 | 9/2003 | Chatelain et al. |
| 6,723,235 | B2 | 4/2004 | Hindsgaul et al. |
| 6,808,685 | B2 * | 10/2004 | Akporiaye et al. .......... 422/130 |
| 6,869,799 | B1 | 3/2005 | Guan et al. |
| 7,115,231 | B1 | 10/2006 | Zhou et al. |
| 7,118,917 | B2 | 10/2006 | Bergh et al. |
| 7,241,424 | B2 | 7/2007 | Guan et al. |
| 2002/0041839 | A1 * | 4/2002 | Cwik et al. ................. 422/220 |
| 2002/0045265 | A1 * | 4/2002 | Bergh et al. ................... 436/37 |
| 2003/0159530 | A1 | 8/2003 | Haas et al. |
| 2004/0109792 | A1 * | 6/2004 | Karlsson et al. ............... 422/99 |

FOREIGN PATENT DOCUMENTS

| | | |
|---|---|---|
| DE | 19632911 | 2/1998 |
| DE | 19809477 | 9/1999 |
| DE | 19855910 | 6/2000 |
| DE | 10036633 | 3/2002 |
| EP | 0168301 | 1/1986 |
| EP | 0423294 | 4/1991 |
| EP | 1001846 | 5/2000 |
| EP | 1167298 | 1/2002 |
| GB | 1021050 | 2/1966 |
| GB | 1399397 | 9/1975 |
| JP | 09296272 A | 11/1997 |
| JP | 09296272 A * | 11/1997 |
| WO | 98/07026 | 2/1998 |
| WO | 01/66245 | 9/2001 |
| WO | 03/078053 | 9/2003 |
| WO | 03/095087 | 11/2003 |
| WO | 2004/052530 | 6/2004 |

OTHER PUBLICATIONS

PCT International Search Report for PCT/EP2004/014509, dated Sep. 6, 2005.

Creer, J G et al., "The Design and Construction of a Multichannel Microreactor for Catalyst Evaluation" Applied Catalysis, Amsterdam NL, vol. 22, No. 1, 1986, pp. 85-95.

Randhava R., "Advanced Configurations for Catalyst Research", Chemical Engineering Progress, American Institute of Chemical Engineers. New York, vol. 70, No. 11, Nov. 1983.

Richardson, J T, et al., "Characterization and Deactivation of NiO-ThO2 Catalysts", Applied Catalysis 48 (1989) 159-176.

Schade and Kunz, Chapter 5 of the textbook "Stromungslehre" [flow theory] ($2^{nd}$ edition, Walter Gruyter, Berlin, 1989).

Tonkovich, et al., "The Catalytic Partial Oxidation of Methane in a Micochannel Chemical Reactor", Pacific Northwest National Library, Battelle Boulevard, Richland WA 999352 (1998).

Torres-Acosta, PhD Thesis, "Computer Automated Testing of Nickel Catalysts for Fischer-Tropsch Synthesis", Jul. 1983.

Perez-Ramirez, J., et al., "The Six Flow Reactor Technology A Review On Fast Catalyst Screening And Kinetic Studies", Catalysis Today 60 (2000) 93-109) Industrial Catalysis, Delft ChemTech, Faculty of Applied Sciences, Delft University of Technology, Julianalaan 136, 2628 BL, Delft, Netherlands.

Singoredjo, L., et al., "Selective Catalytic Reduction of NO with NH3, Over Carbon Supported Copper Catalysts", Catalysis Today, 7 (1990) 157-165).

Thomas, R., et al., "Structure/Metathesis-Activity Relations of Silica Supported Molybdenum and Tungsten Oxide", Journal of Molecular Catalysis, 8 (1980) 161-174.

Stegenga et al., "Hysteresis during CO-oxidation Activity Measurements on Carbon-Supported Copper/Chromium Catalysts", Recl. Trav. Chim, pay-Bas 109, 112-116 (1990).

Wu, C., et al., "Development of a Low Cost, Thermally Stable Monolithic Three-Way Catalyst System", Ind. Eng. Chem. Prod. Res. Des., 1983, 22, 559-585.

Falk, C.D., et al., "Three Way Conversion Catalysts: Effect of Closed-Loop Feed-Back Control and Other Parameters on Catalyst Efficiency", Society of Automotive Engineers Technical Paper Series, 800462, Congress and Exposition Coho Hall, Detroit, Feb. 25-29, 1980.

Vajo, J. J., et al., "Versatile Microreactor for Studies of Gas-Surface Catalytic Reactions Between 10-7 and 1000 Torr", Rev. Sci, Instrum. 58 (7), Jul. 1985.

Bruun, J., "Capillary Flowmeter with Variable Orifices", Sun Oil Company Experimental Division, Norwood, Pennsylvania (1939).

Bruun, J., "Fow Divider for Gases", Sun Oil Company Experimental Division, Norwood, Pennsylvania (1940).

Ertl, G., et al. "Handbook of Heterogeneous Catalysis" vol. 3 pp. 1194 and 1374 (1997).

European Search Report for EP 07010994 published Aug. 14, 2007.

* cited by examiner

DEVICE AND METHOD FOR PRESSURE AND FLOW CONTROL IN PARALLEL REACTORS

CROSS-REFERENCE TO RELATED APPLICATIONS

This application claims priority to and is a divisional application of U.S. application Ser. No. 10/583,753, filed on Sep. 18, 2006, which is a 371 application of PCT/EP04/14509, filed on Dec. 20, 2004, which claims priority to German Application No. 103 61 003.0, filed on Dec. 23, 2003, all hereby incorporated by reference.

The present invention relates to methods and devices for the parallel study of chemical reactions in at least two spatially separated reaction spaces.

The chemical reactions are preferably gas phase reactions. Other embodiments may also involve liquid phase and/or multiphase reactions.

In particular, the invention is suitable for reactions which are not constant volume reactions and/or for reactions in which fluid flows through at least two spatially separated reaction spaces are intended to be controlled together for all the reaction spaces, or for related subsets of them, in the most straightforward way possible.

The reactions may be the same or different. The chemical reaction or the chemical reactions is or are preferably carried out in the presence of a catalytically active substance. The chemical reaction or the chemical reactions is or are preferably carried out at a pressure which is higher than atmospheric pressure. The at least two spatially separated reaction spaces are preferably connected in parallel, and will be referred to below as "parallel reactors".

It has long been known to adjust a predetermined pressure or educt flow in an individual reactor, and this is done for example by using pressure and/or mass flow controllers. In principle, it is also possible to adjust flows and pressures in a plurality of individual reactors connected in parallel, by providing each individual reactor with separate pressure measurement, pressure compensation and mass flow control.

Such parallelized individual reactors for the testing of chemical reactions are disclosed, for example, by the scientific publication "*Characterization and Deactivation of NiO—ThO$_2$ Catalysts*" by J. T. Richardson et al. [*Applied Catalysts* 48 (1989) 159-176]. Here, the pressure and flows are adjusted individually per reactor with the aid of a mass flow controller.

A disadvantage which can be seen with the arrangement described by Richardson et al is that it is not true parallelization, that is to say each reactor still essentially has to be controlled and operated individually. Parallelization of more than three such reactors, for example 48 of 96 reactors, seems to be technically unfeasible with this arrangement and would in any case be unacceptable in terms of cost and control technology.

Besides the individual control of reactors connected in parallel, it is known to feed all the reactors from a common high-pressure gas supply and throttle the efflux of the individual reactors using a respective throttle element, for example a capillary. The product flows from the reactors can then be measured simultaneously or sequentially.

Such an arrangement, with which it is possible to study a very large number of catalyzed gas phase reactions, is described in DE 198 09 477. This arrangement comprises a holding unit with a plurality of recesses, each for holding a solid (catalyst). All the solids are exposed simultaneously to a reaction gas via a common gas feed. Tapering of the channels which are respectively connected to the ends of the reaction spaces provides equidistribution of the gas flows (educt gas flows) into the reaction spaces. Equal educt gas flows into all the reaction spaces are desirable, in particular, because only in this way is it possible to compare the different catalyst activities in various the reaction spaces. If not all the catalysts were exposed to the same educt gas flow, for example, then it is conceivable that a particularly active catalyst might not be identified.

Another highly parallelized arrangement for the testing of materials is described in US 2003/0159530. According to an arrangement disclosed there, the parallel reactor system (which preferably consists of modularly constructed discs) may have "flow control instruments". Passive restrictive flow control of all the reaction channels is possible, for example, if flow restrictors such as metal plates with bores and/or frits, which control the flow of the incoming gas and ensure substantial equidistribution of the incoming gases throughout the individual reaction channels, are provided before the reaction channels. According to US 2003/0159530, it is furthermore possible to provide such a passive restrictive flow control instrument after the reaction channels of the reaction module, in which case such an instrument presents the same effect as flow control before the reaction channels.

A device corresponding to this prior art is schematically represented in FIG. 1 (see also the subsequent description of the figure).

EP 1 001 846 relates to a similar subject as DE 198 09 477. Here again, a plurality of restrictors (tapers in the form of capillaries or pinholes) ensure equidistribution of the fluid flows throughout the individual reaction spaces. EP 1 001 846 discloses that the restrictors may be applied either before or after the reaction spaces.

With respect to gas-liquid separation units, and in particular with respect to discharging product fluid thereof, processes are known in the art that comprise manual steps. Often, such process steps relate to weighing the separation unit before and after the catalytic experiment so that the amount of product fluid can be calculated with high precision from the difference in weight.

EP 423 294 B1 discloses an automated unit for testing and rating fluidized bed crack catalysts. An automated product collection system for liquid products is disclosed as well. With the help of this system, liquid products are collected from different experiments. Such units for catalysis are generally only used for catalytic experiments that proceed at low excess pressures, (i.e. at an operating pressure of the unit between 1 and 5 bar) and in which the catalysts are tested only for a short period of time (between 10 and 300 sec). No hints are given relating to an automated system for collecting products.

Liquid separation units and discharge units are generally known in the field of industrial processing. Representative embodiments are disclosed, for example, in DE 198 55 910 A1 and DE 196 32 911 C3. It is, however, not possible to transpose these technical concepts into the laboratory scale since industrial processing does not take into account the complete transfer of liquids without contamination, miniaturizing of sensor elements, high pressure regime and small accounts of product.

In particular, the processes known from the prior art are not suited for the automatisation and use in high throughput testing units, in which a plurality of catalysts is tested simultaneously in parallel reactors.

Overall, it is an object of the present invention to provide devices for the parallel operation and/or testing of chemical reactions, and associated methods, which are improved in comparison with the prior art. Inter alia, the improved devices and methods should especially but not exclusively make it possible to operate and/or study those chemical reactions which are not constant volume reactions, for example ones in which the number of product gas molecules is greater or less than the number of educt gas molecules.

It is also an object to make it possible to control the fluid flows through the at least two spatially connected reaction spaces in the most straightforward way possible, while the reactions are actually taking place, and in particular so that the pressure common to the reaction spaces is unaffected by this control, or substantially unaffected.

A further object of the present invention, which is particularly related to separating units (separators, strippers etc.), relates to improving the separation of fluid products in high throughput catalysis and/or in case of separating under high pressure. This object relates to both high throughput catalysis in parallel reactors as well as to performing chemical reactions/catalysis in one reaction unit.

These and other objects are achieved according to the invention by providing a device which comprises at least the following components:

(a) at least two spatially separated reaction spaces;
(b) on the reaction space input side, at least one common educt feed for the reaction spaces according to (a);
(d) on the reaction space output side, at least one connection per reaction space to at least one holding gas feed common to all the reaction spaces, or subsets of them;
(e) on the reaction space output side, and downstream of the connection to the holding gas feed according to (d) in the product flow direction, at least one restrictor per reaction space.

The device preferably also comprises at least one other of the following components:

(c) on the reaction space input side, at least one restrictor per reaction space;
(f) at least one unit for analyzing the products from the individual reaction spaces;
(g) at least one common heater for the reaction spaces, and at least one other separate heater for at least one functionally related set of restrictors.

In a preferred embodiment of the device according to the invention, components (a) to (e), optionally not including (c), should be hermetically connected to one another even at pressures higher than ambient pressure. At those places in the device where it is not possible or sensible to bring components together directly, "connections" of the type disclosed below are preferably used in order to bring them together, that is to say preferably channels, tubes or capillaries.

Although the devices and methods of the present invention can be used to particular advantage with non-constant volume reactions, they can also be used without disadvantage when one or all of the reactions takes place with a constant volume. An exemplary configuration of this embodiment is dealt with schematically in FIG. 2 (see also the subsequent description of the figure).

The object of the present invention is also achieved by a method for the parallel conduct of at least two chemical reactions, which may be the same or different, in at least two spatially separated reaction spaces. The method according to the invention comprises at least the following steps:

(A) bringing at least one substance in at least two spatially separated reaction spaces in contact with at least one educt via at least one educt feed common to all the reaction spaces, or subsets of them;
(B) simultaneously bringing at least one product flow from of the at least two spatially separated reaction spaces in contact with a holding gas from a holding gas feed common to all the reaction spaces, or subsets of them.

The educt feed then preferably takes place via a restrictor upstream of each reaction space on the reaction space input side. Sets (or groups) of functionally related restrictors on the reaction space input side (and/or reaction space output side) are preferably identical or similar, and present an identical or similar flow resistance. The restrictors or sets (groups) of restrictors therefore lead at least to approximate equidistribution of the educt gas flows throughout the reaction spaces. This applies irrespective of whether the restrictors are fitted only on the reaction space output side or also on the reaction space input side.

The holding gas is preferably delivered via at least one holding gas feed and in the direction of the output side of every reaction space. In another preferred embodiment, the holding gas pressure is then adjusted so that it is always less than the pressure on the side with the educt feed.

In order to keep the pressure constant in all the reaction spaces, even if there are volume fluctuations in the reaction spaces, one restrictor per reaction space is provided at least on the reaction space output side and downstream (relative to the flow of the product flowing out of the reaction space) of the node/mixing point, where the holding gas is fed in.

The restrictors on the reaction space output side should preferably be configured so that they present identical or similar flow resistances. The flow resistances should preferably be dimensioned so that any product delivery components which may be downstream of the restrictors, for example multi-port valves, can be used according to specification.

There are in principle no restrictions relating to the pressure in the reaction space. The pressure in the reaction space is preferably from 1 bar to 500 bar, more preferably from 2 bar to 200 bar, more preferably from 20 bar to 160 bar. These pressure ranges also apply to the pressure of the common educt feed and/or the common holding gas and control fluid feeds (see below).

It is preferable for the flow resistance in the reaction spaces, that is to say the flow resistance between the reaction space input and the reaction space output, to be negligible compared with the flow resistance of the restrictors. Here, "negligible" means that the flow resistance of each reaction space should be less than 50% of the flow resistance of the restrictor with the lowest flow resistance, preferably less than 10%, more preferably less than 1%.

A particular advantage of the method according to the invention is that (i) a flow resistance in relation to the individual reaction spaces is produced for the educt by the restrictors on the reaction space input and/or output side, and that at the same time (ii) the pressure in the reaction spaces is kept constant by connection to a holding gas feed common to all the reaction spaces, or subsets of them. This results in a constant educt flow through all the reaction spaces, even when there are volume fluctuations in them.

If a volume contraction is now to occur in a reaction (for example because a gas is consumed during a reaction), then correspondingly more holding gas will be delivered (for an equal educt flow). In a practically preferred embodiment, in "start-up operation", that is to say when there is already an educt flow through the reaction spaces and a pressure $p_1$ is applied to the reaction spaces from the side with the educt feed, but the reactions themselves have not yet taken place (for example because the catalyst has not yet been activated, or because the temperature has not yet been reached), the pressure $p_2$ of the holding gas will be adjusted with the aid of a pressure controller on the holding gas feed side, so that the pressure obtained in the reaction spaces is approximately the pressure intended to prevail there during the reaction.

Following this, the educt flow from the common educt feed is preferably adjusted so that educt flows into the reaction spaces from the educt feed. In this case, it is preferable for the flow meter on the holding gas feed side to indicate no holding gas flow, or only a small holding gas flow. Here, $p_2$ should be less than $p_1$ (otherwise no educt would flow through the reaction spaces).

If a volume expansion is to occur during the reaction, then this correspondingly reduces the flow from the holding gas feed and the pressure in the reaction spaces remains substantially constant. So that excess gas can be "absorbed" by the holding gas feed during the volume expansion, in a preferred embodiment, the holding gas flow is adjusted to a non-zero but constant value in the aforementioned start-up operation. With this operating procedure, it is possible to "absorb" both volume contractions and volume expansions.

In another embodiment, the device according to the present invention comprises at least the following components:
(a) at least two spatially separated reaction spaces;
(b) on the reaction space input side, at least one common educt feed for the reaction spaces according to (a), or for subsets of them;
(d) on the reaction space output side, at least one connection per reaction space to at least one holding gas feed common to all the reaction spaces;
(d') on the reaction space output side, at least one connection per reaction space to at least one control fluid feed common to all the reaction spaces;
(e) on the reaction space output side, and downstream of the connection to the holding gas feed according to (d) and the connection to the control fluid feed according to (d') in the product flow direction, at least one restrictor per reaction space.

The device preferably also comprises at least one other of the following components:
(c) on the reaction space input side, at least one restrictor per reaction space;
(f) at least one unit for analyzing the products from the individual reaction spaces;
(g) at least one common heater for the reaction spaces, and at least one other separate heater for at least one functionally related set of restrictors.

A device which illustrates this embodiment in principle is shown in FIG. 3 (see also the subsequent description of the figure).

For the method according to the invention using a control fluid feed, in a manner corresponding to the device according to the invention with a control fluid feed, a step (C) is carried out in addition to the aforementioned steps (A) and (B):
(C) simultaneously bringing the at least one product flow from of the at least two spatially separated reaction spaces in contact with a control fluid from a control fluid feed common to all the reaction spaces, or subsets of them.

In contrast to the holding gas feed, the purpose of which is to compensate for possible volume fluctuations in the individual reaction spaces, the purpose of the control fluid feed is to regulate the fluid flows through the individual reaction spaces together and simultaneously to a predetermined equal value (reaction space flow control), but without this changing the pressure in the reaction spaces.

This is preferably done by adjusting a predetermined total control fluid flow ($F^R_{tot}$) in a mass flow controller of the control fluid feed. Since there is a restrictor in the control fluid feed between the mass flow controller and each of the plurality of spatially separated connections to the individual reaction spaces (see below), and the restrictors all have the same or similar flow resistance/resistances, the total control fluid will be divided into equal flows to the individual reaction spaces.

If a flow of 1.5 l/h is adjusted in the mass flow controller of the control fluid feed, for example, and if the control fluid feed branches after the mass flow controller into three separate connections (each with a restrictor) which lead to three spatially separated reaction spaces, then a flow of about 0.5 l/h will be obtained after each restrictor.

There is in principle no restriction relating to the flows thus adjusted with the aid of a mass flow controller, preferably with the aid of a thermal mass flow controller. The flow of the control fluid is preferably adjusted so that the educt from the educt feed can flow through the reaction spaces, or subsets of them. It is furthermore preferable for the flow of at least one control fluid to be from 0.001% to 99.9% of the flow of at least one educt fluid, more preferably from 95% to 0.01% thereof, more preferably from 90% to 0.1%. If the volume of the reaction spaces is from 0.1 to 50 ml, then control fluid flows of from 0.5 to 10 l/h are preferred in the context of the present invention.

Since these flows are already so to speak "provided" by the control fluid feed, the flow to be provided by the educt feed is reduced and therefore the flow through the reaction spaces is reduced, each by this amount. If a constant control fluid flow is adjusted in the aforementioned "start-up phase", then the flow of educt through the reactor can respectively be reduced or increased by increasing or reducing this control fluid flow, without the pressure in the reaction spaces being affected significantly or even at all by this.

Accordingly, the educt flow for a gas phase reaction can be reduced (increased) by increasing (reducing) the control gas flow from the control gas feed, and the educt flow for a liquid phase reaction can be reduced (increased) by increasing (reducing) the control liquid flow from the control fluid feed.

Overall, therefore, in this embodiment it is possible to control the amounts of fluid flowing through all the reaction spaces in a straightforward way, and in particular with a single mass flow controller, actually while the parallel reactions are taking place, and in fact without significantly affecting the pressure prevailing in the reaction spaces.

In a preferred embodiment of the invention, the connections intended to lead from the control fluid feed to the reaction spaces are brought together at a node/mixing point with the connections attached to the reaction spaces on the reaction space output side for discharging the products.

In this case, these nodes/mixing points for feeding the control fluid are preferably downstream (relative to the flow direction of the control fluid) of the restrictors of the control fluid feed, and also upstream (relative to the flow direction of the product/products) of the restrictors on the reaction space output side [restrictors according to (e)].

The connections to the control fluid feed may come together with the connections to the reaction spaces at the same node/mixing point as the connections to the holding gas feed. It is preferable, however, that each connection coming from the control fluid feed should be brought together with a connection leading to a reaction space, on the reaction output side, at a different node/mixing point from the connections of the holding gas feed to the reaction spaces. It is furthermore preferable that the connections to the control fluid feed should be closer to the reaction spaces that the connections to the holding gas feed.

In the method according to the invention using a control fluid feed, the total control fluid flow $F^R_{tot}$ to be adjusted by the mass flow controller may be adjusted in the start-up phase so that it is equal to zero at the start of the reactions in the reaction spaces. This maximizes the educt flow through the reaction spaces at the start of the method. In this case, the educt flow can just be minimized during the reactions by adjusting a positive control fluid flow.

In a preferred embodiment, the total control fluid flow $F^R_{tot}$ to be adjusted by the mass flow controller in the start-up phase may be adjusted to a non-zero value. In this case, the educt flow through the individual reaction spaces can be both reduced and increased for all the reaction spaces, as required, by increasing or reducing the control fluid flow.

Purely in principle, in order to control the educt flow, it is possible to adjust the flow of the holding gas itself via a mass flow controller on the holding gas side, instead of providing a separate unit (here the control fluid feed) from the holding gas feed. The holding gas may therefore be the holding fluid. However, it is preferable to use two decoupled units here, on the one hand the holding gas feed to adjust a constant holding pressure and to compensate for volume fluctuations in the reaction spaces and, on the other hand, the control fluid feed to simultaneously control the educt flow into the individual reaction spaces.

In another embodiment of the present invention, particular attention should be paid to the technical reaction feature that the product flowing out of the at least one reaction space may be a liquid phase, or contain a liquid phase in addition to a gas phase. The liquid phase may then partially "entrain" the gas phase, or contain an at least partially dissolved gas phase. Such a product is preferably obtained when a multiphase reaction, in particular a gas-liquid reaction, is carried out in the reaction space. In this case, in a preferred embodiment, the reaction space is designed as a gas-liquid-solid reactor, more preferably as a trickle bed reactor In the case of this embodiment, it is advantageous and preferable that the gas phase should be separated from the liquid phase for analysis purposes, and preferably in gas-liquid separation units, with one such unit per reaction space being located downstream of the latter on the reaction output side.

In this embodiment, the device for the parallel testing of multiphase reactions according to the present invention comprises at least the following components:
(a) at least two spatially separated reaction spaces;
(b) on the reaction space input side, at least one common educt feed for the reaction spaces according to (a), or subsets of them;
(b') on the reaction space input side, at least one common educt liquid feed for the reaction spaces according to (a), or subsets of them;
(b") on the reaction space input side and as part of the connections of the common educt liquid feed to the reaction spaces according to (a), at least one restrictor per connection;
(e') on the reaction space output side and downstream of the connection to an optional control fluid feed, in the flow direction of the at least one product, at least one gas-liquid separation unit per reaction space;
(e") associated with each gas-liquid separation unit, a connection for discharging the at least one reaction gas;
(e'") per connection according to (e") and via a node/mixing point, a connection to a common holding gas feed;
(e"") after the nodes according to (e'"), that is to say downstream in the flow direction of the reaction gas, but before an optional analysis unit, at least one restrictor per connection according to (e").

The connection according to (e") is then preferably fitted to the head of the gas-liquid separation unit. The connections of the common educt liquid feed to the at least two reaction spaces are then spatially and materially separated from the common educt feed according to (b). The principle of such an embodiment is outlined by way of example in FIG. 4 (see also the subsequent description of the figure).

In a preferred embodiment, the device also comprises at least one other of the following components:
(c') on the reaction space input side and associated with the connections of the common educt feed to the at least two reaction spaces, at least one restrictor per reaction space;
(d') on the reaction space output side, at least one connection per reaction space to at least one control fluid feed common to all the reaction spaces;
(f) at least one unit for analyzing the reaction gases from the individual reaction spaces;
(g) at least one common heater for the reaction spaces, and at least one other separate heater for at least one functionally related set of restrictors.

In another preferred embodiment, at least one of the reaction spaces according to (a) is designed as a gas-liquid-solid reactor, and preferably all the reaction spaces are. It is preferable for the connections of the common educt liquid feed to the at least two reaction spaces to be spatially and materially separated from the connections to the common educt feed according to (b).

With the aid of this device, the method can be carried according to the invention as follows:
(A') bringing at least one substance per reaction space in at least two spatially separated reaction spaces in contact with at least one educt via at least one educt feed common to all the reaction spaces, or subsets of them, and with at least one educt liquid via at least one educt liquid feed common to all the reaction spaces, or subsets of them;
(B') simultaneously bringing the at least one reaction gas flowing out of each gas-liquid separation unit in contact with a holding gas from a holding gas feed common to all the gas-liquid separation units;
(D) introducing the product flows flowing out of the reactor into at least one gas-liquid separation unit per reaction space.

In addition to the aforementioned steps, at least one other step in the method according to the invention preferably involves:
(C') simultaneously bringing the at least one product flow from at least two spatially separated reaction spaces in contact with a control fluid from a control fluid feed common to all the reaction spaces.

In the method according to the invention, it is preferable that the space velocity of the educt liquid (LHSV) into the reaction spaces should range from $0.2\ h^{-1}$ to $10\ h^{-1}$, preferably from $0.5\ h^{-1}$ to $3\ h^{-1}$.

The disclosure relating to the aforementioned embodiments also applies to the common holding gas feed, the common educt feed and the common control fluid feed.

Regarding the control fluid feed, further to the aforementioned embodiments, the control fluid in the embodiments comprising gas-liquid separation units is particularly preferably a gas. In this case, the control gas is not used to control the flows through the reaction spaces, but as a "strip gas" which flows through the gas-liquid separation units according to the flow direction set up in the device, where it contributes to gas or volatile components dissolved in the liquid phase being extracted ("stripped") from the latter.

An inert gas is preferably used as the strip gas, more preferably nitrogen or a noble gas or a mixture of these. The viscosity of the reaction gas can preferably also be increased or stabilized by the strip gas. This is advantageous in order to induce a sufficiently high flow resistance in the restrictors even for low-viscosity gases.

In yet another aspect of the present invention, particularly relating to the aforementioned separation units ("separator"), an automated process for discharging product fluids out of the separator is provided. An apparatus to be used in said process is provided as well.

In particular, in this aspect, the present invention relates to a device for the processing or testing of chemical reactions, comprising at least one unit for the controlled discharge of product fluid out of at least one high pressure end fluid separation unit, wherein said fluid separation unit is in fluid connection, via a discharge valve, with a collecting area that is at a lower pressure than the high pressure fluid separation unit.

While this aspect also applies to single unit reaction systems, parallel testing with corresponding parallel units is preferred.

Furthermore, the present invention relates to a process for the controlled discharge of product fluid out of a high pressure end separation unit that is part of reaction unit for testing at least one catalyst, comprising at least the following steps:
(i) opening of a discharge valve triggered by the signal of a level sensor;
(ii) discharging of the product fluid from the at least one separation unit, via said discharge valve, into at least one collecting area;
(iii) closing of said discharge valve, triggered by a signal corresponding to a change in pressure and/or a change in fluid flow.

This aspect according to the invention obviates or limits the use of constructive elements that are difficult to control and regulate and that may be not well-suited for high throughput research.

Regarding the use of the embodiments according to the present invention, the following should apply inter alia: The device according to the invention and the method according to the invention can in principle be used for the parallel study of all chemical reactions in which at least one fluid phase is involved.

Examples of suitable reactions are the decomposition of nitrogen oxides, ammonia synthesis, ammonia oxidation, oxidation of hydrogen sulfide to form sulfur, oxidation of sulfur dioxide, direct synthesis of methylchlorosilanes, oil refining, oxidative coupling of methane, methanol synthesis, hydrogenation of carbon monoxide and carbon dioxide, conversion of methanol into hydrocarbons, catalytic reforming, catalytic cracking and hydrocracking, carbon gasification and liquefaction, fuel cells, heterogeneous photocatalysis, synthesis of ethers, in particular MTBE and TAME, isomerizations, alkylations, aromatizations, dehydrogenations, hydrogenations, hydroformylations, selective or partial oxidations, aminations, halogenations, nucleophilic aromatic substitutions, addition and elimination reactions, dimerizations, oligomerizations and metathesis, polymerizations, enantioselective catalysis and biocatalytic reactions and for materials testing, and particularly in this case for the determination of interactions between two or more components on surfaces or substrates, in particular in composite materials.

Standard petrochemical reactions are preferred in the context of the present invention, in particular hydroprocessing, hydrocracking, desulfurization (HDS), denitrogenation (HDN), oligomerizations, polymerization reactions, aromatization reactions, hydrogenations, Fischer-Tropsch reactions.

The essential terms as used in the present invention will be explained below, and in respect of their technical content if they are not readily apparent from knowledge of the art. The preferred embodiments are also respectively indicated.

A gas phase reaction in the context of the present invention should be understood as a chemical reaction in which all the educts and products are present as gases under the reaction conditions.

A liquid phase reaction in the context of the present invention should be understood as a chemical reaction in which all the educts and products are liquids under the reaction conditions.

A multiphase reaction in the context of the present invention should be understood as a chemical reaction which takes place under the reaction conditions in the presence of at least two different phases, which are not fully miscible with one another. Some or all of these phases, or individual phases, may be liquid and/or solid and/or gaseous. The phases may be educts or products or both.

A non-constant volume reaction in the context of the present invention should be understood as any chemical reaction in which the number of moles of gaseous substances changes per formula conversion, and/or the volume increases or decreases owing to a solid/solid, solid/liquid, liquid/liquid, liquid/gas or (in the case of non-ideal gases) gas/gas conversion.

A "common educt feed" in the context of the present invention should be understood as any type of feed in which at least one educt is fed to at least two spatially connected reaction spaces, and specifically so that the reaction spaces are exposed simultaneously and together to the at least one educt.

A common educt feed in the context of the invention preferably comprises at least the following components:
(i) at least one supply unit for the at least one educt;
(ii) at least one pressure controller and/or mass flow controller for the at least one educt.

Here, the "educt" is preferably a fluid. The educt more preferably contains at least one gas phase, in which case it is referred to as an "educt gas".

An "educt gas" in the context of the present invention should be understood as any gas or any gas mixture which can be fed through the reaction spaces, or subsets of them (via the common educt feed). The educt gas may, although it does not have to, contain an inert gas and/or an admixture, which may be used as an internal standard for the determination of particular properties (for example gas flow etc.).

The educt gas preferably contains at least one component which takes part in the chemical reaction to be studied. The educt gas may also contain solid and/or liquid components as a disperse phase (aerosol, fumes, foam etc.).

The common educt feed preferably takes place via a manifold, a bifurcating arrangement of channels/tubes (see below) or capillaries (see below) with a common node/mixing point (see below). In another preferred embodiment, the common educt feed preferably takes place via an educt feed chamber. Such an educt feed chamber is described by way of example in DE 198 09 477 as a gas feed chamber. Full reference is made here to the disclosure of DE 198 09 477 in respect of a common gas feed chamber.

The at least one educt fluid is preferably metered using a mass flow controller (see below). Preferably, but not necessarily, the mass flow is in this case kept constant during the operation of the device. If an educt gas is being used as the fluid, then pressure compensation which should preferably be employed using a pressure controller (see below) will ensure that the pressure of the at least one educt gas is kept at a constant value $p_1$—where appropriate within threshold values to be predetermined. Besides the at least one educt, any other fluid components may also be fed to the reaction spaces via the common educt supply.

In a preferred embodiment, at least one solid substance in at least one reaction space is exposed to a gas or a liquid. This solid substance is preferably part of a catalyst bed. The exposure is typically specified in units of $h^{-1}$, and is referred to as the "GHSV" (gas hourly space velocity) or "space velocity", when the educt is a gas. In a similar way, exposure to a liquid is referred to as "LHSV" (liquid hourly space velocity) using the same units.

For the method according to the invention, the GHSV is preferably from $300\ h^{-1}$ to $10,000\ h^{-1}$, preferably from $500\ h^{-1}$ to $3000\ h^{-1}$, whereas the LHSV is from $0.2\ h^{-1}$ to $10\ h^{-1}$, preferably from $0.5\ h^{-1}$ to $3\ h^{-1}$.

A fluid in the context of the present invention is any substrate in which the elementary components forming the substance, for example elements or molecules as well as aggregates of these, move relative to one another and, in particular, do not have any long-range order with one another. These include, in particular, liquids or gases as well as waxes, oils, dispersions, fats, suspensions, melts, powdered solids etc. If the medium is in a liquid form, then multi-phase liquid systems should also be understood as fluids. In any event, all mixtures of the aforementioned substances are included.

A "product" in the context of the present invention should be understood as any fluid or any fluid mixture, as well as any disperse phase (which may possibly also contain solid components) which can be discharged from at least one reaction space and analyzed. The product may contain some educt, although it does not have to. The product may, although it does not have to, contain a fluid reaction product of the conversion which has taken place in a reaction space.

In a preferred embodiment, the product is a gas or a gas mixture, or a liquid which contains a physically or chemically dissolved gas. If the product is a gas or a gas mixture, then it will be referred to as a "reaction gas". In particular, the gas emerging from the gas-liquid separation unit in a particular embodiment of the invention is also a reaction gas.

A "common educt liquid feed" in the context of the present invention should be understood as any type of feed in which at least one educt liquid is fed to at least two spatially connected reaction spaces, and specifically so that the reaction spaces are exposed simultaneously and together to the at least one educt liquid. The reaction space is preferably a gas-liquid-solid reactor in this case. The common educt liquid feed is preferably provided in addition to the aforementioned common educt feed. The educt liquid feed is preferably used in multiphase reactions.

A common educt liquid feed in the context of the present invention preferably comprises at least the following components:
 (i) at least one supply unit for the control fluid;
 (ii) at least one mass flow controller;
 (iii) downstream (relative to the flow direction of the control fluid) of the mass flow controller, one restrictor per connection of the control fluid feed to the reaction spaces.

The supply unit for the at least one educt liquid is preferably a pump.

A restrictor in the context of the present invention should be understood as any component which presents a significant flow resistance against any fluid flowing through it. Here, "significant" means that the flow resistance of any restrictor is at least 10%, preferably at least 50%, more preferably more than 100% greater than the flow resistance of any other component in the device, apart for all the other restrictors.

If restrictors are used on the reaction space input side, then in the method according to the invention it is preferable to produce a pressure drop of at least 10 bar, more preferably a pressure drop of at least 20 bar, more preferably at least 50 bar. Here, the pressure drop is the difference: "pressure before the reaction space" less the pressure after the reaction space.

If the restrictors are used on the reaction space output side, in which case besides the liquid equidistribution, they may also be used to "relax" the pressure prevailing in the reaction spaces to a pressure suitable for the components which may lie downstream of the reaction spaces, for example a multiport valve and/or an analysis unit, then in the method according to the invention there should preferably be a pressure drop of at least 10 bar, preferably at least 20 bar, more preferably from the reaction space pressure to ambient pressure.

Pluralities of restrictors are preferably grouped according to their functional relationship as "sets" (or "groups"). A set is in this case preferably a plurality of at least two restrictors, which may or may not be spatially associated, but which in any event have the same functionality in the device according to the invention. For example, all the input-side restrictors or all the output-side restrictors belonging to the reaction spaces, or subsets of reaction spaces, constitute such a set. Likewise, there is a set of restrictors which respectively belong to the educt liquid feed or to the control fluid feed or to the holding gas feed.

Examples of restrictors which may be provided in the context of the present invention include metal plates with bores, sintered metal plates, pinholes, micromachined channels and/or frits (porous materials, in particular sintered ceramic frits). They are intended to control the flow of the inflowing fluid, and to ensure substantial equidistribution of the inflowing fluid throughout the individual reaction channels ("passive" restrictors).

Individual active restrictive flow control, which is preferably automated, can be carried out by using a control valve, for example a needle valve, or a mass flow controller (see below). Therefore, any valve, even a closed one, is a "restrictor" in the sense of the present invention.

A particularly preferred restrictor in the context of the present invention is a capillary. Regarding the configuration of a capillary, reference is made to the following disclosure in relation to "connections".

The internal diameter of a capillary in the context of the present invention, when a gas flows through the capillary, preferably ranges from 5 µm to 500 µm, more preferably from 25 µm to 200 µm. If it is at least partially a liquid which flows through the capillary, then internal diameters of from 5 µm to 1 mm, preferably from 100 µm to 500 µm are also possible. Irrespective of whether a liquid or a gas is to flow through the capillary, the length of the capillary should range from 1 mm to one metre, preferably from 5 cm to 50 cm.

Capillaries are particularly preferred because they make it possible to adjust an intended flow resistance by particularly straightforward equipment means. This can be shown, for example, with the aid of the Hagen-Poiseuille equation known to the person skilled in the art. This equation states that the pressure drop (corresponding to the flow resistance) occurring when a fluid flows through tubes (capillaries), with a radius R and a length L, is simply proportional to the length L (that is to say the pressure essentially drops linearly as the length of the capillary increases), simply proportional to the gas volume flow (that is to say the pressure drops linearly as the gas volume flow increases) and inversely proportional to the fourth power of the radius of the capillary (that is to say the pressure drops with the fourth power of the narrowing capillary).

Using a realistic prefactor for catalytic gas phase reactions in the Hagen-Poiseuille equation (which in particular involves the gas volume flow and the gas viscosity) and with a length of 50 cm for the capillary, for example, a "pressure drop" of about $10^{-7}$ bar is obtained with an internal radius of 2.5 mm for the capillary. It is clear that with a initial pressure of 1 bar, such a pressure drop is irrelevant and a capillary with such dimensions cannot be a restrictor in the context of the present invention. If the capillary has an internal diameter of 100 µm, however, then this leads to a pressure drop of about 0.2 bar and therefore a 20% reduction of the 1 bar initial pressure. Such a capillary can be regarded as a restrictor in the context of the present invention. Concerning the relevant technical knowledge in this field, for example, reference may be made to Chapter 5 of the textbook "Strömungslehre" [flow theory] by Schade and Kunz ($2^{nd}$ edition, Walter Gruyter, Berlin 1989).

The fact that the Hagen-Poiseuille equation has been used to illustrate the functionality does not mean that the device according to the invention can be described by using this equation.

A reaction space in the context of the present invention should be understood as any closed unit which is provided with at least one "input" for feeding an educt and an "output" for discharging a product. There are no restrictions relating to the spatial configuration of the reaction space.

According to the invention, when there are more than four reaction spaces, all the reaction spaces present in the device may preferably also be grouped into subsets which are dealt with differently in terms of reaction technology, and may for example each belong to a different educt/holding gas/control fluid/educt liquid feed. There are preferably at least two reaction spaces per subset.

The reaction space preferably has a volume of from 0.1 ml to 50 ml, more preferably from 0.5 ml to 20 ml, more preferably from 0.5 ml to 2 ml.

In a preferred embodiment, the reaction spaces are designed as reaction channels in the manner of a tube reactor (tube bundle reactor). These reaction channels are preferably tubular, more preferably continuous and, in particular, tubular and continuous. The reaction tubes/channels may have fittings for connection to other components of the device. Such fittings are commercially available in many variants, and are well known to the person skilled in the art.

The reaction channels may have an inset of any configuration which is suitable for holding solids (catalysts), for example in the form of powders or porous beds or shaped bodies. Furthermore, it is also possible to coat the walls of the reaction channels with substances, for example a catalytically active substance. In this context, the relevant disclosure of DE 198 09 477 is fully incorporated into the present application. Meshes, permeable materials, frits or membranes may preferably be used as insets for holding solids (powders, shaped bodies). It is also be conceivable to use quartz wool.

In another preferred embodiment specifically adapted inner tubes, for example with catalyst chairs, may be fitted into the reaction spaces and facilitate transfer of the catalyst samples into the reaction space (liners). In this context, the relevant disclosure of DE 100 36 633 is fully incorporated into the present application.

In another preferred embodiment, the reaction spaces/reaction channels are fitted into a solid body of any geometry (preferably: disc, block, tube, round body), with at least two reaction spaces being part of the same solid body.

Unless otherwise mentioned, the term "reaction space input side" as used in the present invention refers to the part of the reaction space which lies upstream, as viewed in the flow direction of the at least one educt. Correspondingly, unless otherwise mentioned, "reaction space output side" refers to the part of the reaction space which lies downstream, as viewed in the flow direction of the educt.

According to the invention, it is also possible for there to be a plurality of inputs and/or a plurality of outputs per reaction space.

There are parallel reaction spaces or parallel reactors in the context of the present invention when the number of reaction spaces connected to the common educt feed on the reaction space input side is greater than or equal to 2, preferably greater than 3, more preferably greater than 7. Even though there is in principle no restriction relating to the number of parallel reactor spaces, except that it must be at least two, there are nevertheless preferably 16, 32, 48 or 96 or more parallel reaction spaces.

In the method according to the invention, at least one substance in the reaction space is preferably brought in contact with at least one educt fluid. There is no restriction relating to this substance (or these substances). It is nevertheless preferable to use a catalyst, which is more preferably in a solid form (for example as a powder, bed or film deposited on the walls of the reaction space). Besides this catalyst, there may be any other desired substances in the reaction space, for example further reaction partners or inert substances.

A connection in the context of the present invention is any means which allows a fluid communication between two points in the device, and which is closed to the outside (out of the device) in terms of the exchange of substances. The connection is preferably fluid-tight, more preferably fluid-tight even at high pressures. More preferably, the connection is implemented using the channels, tubes or capillaries as described below.

The term "channel" in the context of the present invention describes a connection extending through a body, preferably a solid body of any geometry, preferably a round body, a block, a disc or a plate, between two openings at the surface of the body, which in particular allows a fluid to pass through the body.

A "tube" in the context of the present invention is a channel in which a continuous cavity is formed and the geometry of the outside of the tube essentially follows the inside geometry defining the cavity.

A capillary may essentially be regarded as a special case of a tube, with the difference that particular dimensions need to be complied with in a capillary—according to the specifications as given above regarding "restrictors". A capillary in the context of the present invention can function both as a "connection" and as a "restrictor".

A channel, tube or capillary may have any geometry in the present case. Regarding the cavity formed internally by the channel, tube or capillary, there may be a variable cross-sectional area over the length of the channel, tube or capillary or a constant cross-sectional area.

The internal cross section may, for example, have an oval, round or polygonal contour with straight or curved connections between the vertices of the polygon. A round cross section or an equilateral polygonal cross section are preferred.

A "holding gas" in the context of the present invention should be understood as any gas which can be applied via a common holding gas feed to the output sides of the at least two reaction spaces.

Any gas or gas mixture which does not react with the products flowing out of the reaction space and the materials of the device, with which it comes in contact, or which reacts only so that the reaction to be studied is not substantially affected, may be used as a holding gas. An inert gas or an inert gas mixture is preferably used as a holding gas. Nitrogen and the noble gases of the periodic table, and all their mixtures, are particularly preferred.

The purpose of the holding gas according to the invention is to avoid or at least minimize volume fluctuations in the individual reaction spaces, when there is at least one non-constant volume reaction in at least one of the reaction spaces.

A common "holding gas feed" in the context of the present invention comprises the following components:
  (i) at least one supply unit for the holding gas,
  (ii) at least one flow meter,
  (iii) at least one pressure controller.

A common holding gas feed should be understood as meaning that each of the two spatially separated reaction spaces is connected to the same holding gas feed. It is furthermore conceivable to use more than one holding gas feed, with the proviso so that the reaction spaces and the holding gas feeds are preferably in material connection with one another.

In a preferred embodiment, the holding gas feed including all the connections to the reaction spaces is designed to be fluid-tight for all pressures prevailing in the specific chemical reactions.

In a preferred embodiment, pressure compensation using a pressure controller (see below) ensures that the pressure of the at least one holding gas is kept at a constant value $p_2$—where appropriate within threshold values to be predetermined.

So that an educt, in particular an educt gas, flow into the reaction spaces against the holding gas, the pressure $p_2$ of the holding gas should be kept less than the liquid or gas pressure $p_1$ of the educt.

In a preferred embodiment, the common holding gas feed comprises a flow meter, as mentioned above. It is also preferable that the supply unit for the holding gas, the mass flow controller and optionally the flow meter should all be arranged along a gas-tight connection, and specifically in the order indicated above.

The connection branches downstream of the mass flow controller in terms of the holding gas flow, preferably via nodes/mixing points, into a plurality of connections which then respectively lead into the connections coming from the reaction space outputs via nodes/mixing points, and specifically one per individual reaction space. It is also possible to feed the plurality of connections on the holding gas side directly into the reaction spaces.

A node/mixing point in the context of the present invention should be understood as any connection between a tube, channel or capillary and at least one other tube, channel or capillary. There are in principle no restrictions relating to the design configuration of such a node/mixing point. The node/mixing point preferably has a small dead volume and ensures good mixing of the fluids flowing together. "T"-shaped or "Y"-shaped nodes are preferably used.

The "introduction" which takes place between the channels/tubes/capillaries at the nodes/mixing points is preferably carried out using commercially available fittings, which are comprehensively known to the person skilled in the art. Besides such releasable connections, it is also possible for the channels/tubes/capillaries coming together at the node/mixing point to be connected permanently, for example by welding.

A "control fluid" in the context of the present invention should be understood as any gas or any liquid, or any mixture of these, which can be applied via a common control fluid feed to the product flows from at least two reaction spaces.

Any fluid or fluid mixture which does not react with the products flowing out of the reaction space and the materials of the device, with which it comes in contact, or which reacts only so that the reaction to be studied is not substantially affected, may be used as a control fluid.

The control fluid may be liquid or gaseous. If the reactions in the reaction space are gas phase reactions, then a control gas is preferred as the control fluid. If a liquid phase reaction is carried out in the reaction space, then a control liquid is correspondingly preferred.

If the control fluid is a gas, then the disclosure given above relating to the holding gas applies accordingly. Water and solvents, as well as highly viscous or non-Newtonian liquids, for example inert oils, are preferred as inert liquids. Supercritical gases are also regarded as liquids for the purposes of the present invention.

A common control fluid feed in the context of the present invention comprises
  (i) at least one supply unit for the control fluid,
  (ii) at least one mass flow controller,
  (iii) downstream (relative to the flow direction of the control fluid) of the mass flow controller, one restrictor per connection of the control fluid feed to the reaction spaces.

A common control fluid feed should be understood as meaning that each of at least two spatially separated reaction spaces is connected to the same control fluid feed. It is furthermore conceivable to use more than one control fluid feed, with the proviso so that the reaction spaces and the control fluid feeds are preferably in material connection with one another.

In a preferred embodiment, the control fluid feed including all the connections to the reaction spaces is designed to be fluid-tight for all pressures prevailing in the specific chemical reactions.

A "flow meter" in the context of the present invention is any component which can measure the fluid flow, for example the total gas flow of a holding gas. Such components are also known to the person skilled in the art as a "flow indicator" ("FI"). Flow meters which are based on a thermal method are preferred in this case.

A "pressure controller" in the context of the present invention is any component which can measure the pressured of a fluid, and optionally adjust it after comparison with a predetermined setpoint or threshold value. Such components are also known to the person skilled in the art as pressure indicator control ("PIC").

A "mass flow controller" in the context of the present invention should be understood as any measuring and control loop, with the aid of which the flow of a liquid can be measured and optionally adjusted variably after comparison with a setpoint value. A mass flow controller can be regarded as an active restrictor in the sense described above. A mass flow controller is also known to the person skilled in the art as "FIC" (flow indicator control). Mass flow controllers in the context of the present invention may be used both for liquids and for gases. Those mass flow controllers which are based on a thermal measuring principle are preferably used.

In a preferred embodiment of the device according to the invention, the products are discharged from the reaction space via channels/tubes/capillaries on the reaction space output side. As mentioned above, these channels/tubes/capillaries are optionally connected to the common (to the reaction spaces) holding gas feed via a node/mixing point. Downstream (in terms of the flow direction of the at least one product) of these nodes/mixing points, there is one restrictor on the reaction space output side per channel/tube/capillary connected to the reaction space. The purpose of this restrictor is to induce a flow resistance which "relaxes" the product so that components which may be sensitive to a high pressure, in particular multi-port valves, as well as at least one analysis unit can be connected downstream.

A "multi-port valve" in the context of the present invention should be understood as any valve circuit which delivers the products from at least two reaction spaces, preferably from at least four, more preferably from at least eight reaction spaces, in a materially separate way via connections. The valve circuit can send all the products simultaneously or separately to at least one analysis unit, or all the products simultaneously or separately to an outlet instrument. In the device according to the invention (and in the associated method), it is possible to use any number of multi-port valves connected in parallel, which in turn may be connected to any number of reaction spaces.

A "gas-solid-liquid reactor" in the context of the present invention should be understood as any reactor which has at least two continuous phases and at least one stationary phase. At least one gas phase and at least one liquid phase are in this case preferred as continuous phases.

A solid phase is preferred as the stationary phase. In terms of reaction technology, this reactor is preferably configured as a trickle bed reactor.

A "gas-liquid separation unit" in the context of the present invention should be understood as any physical unit, with the aid of which it is possible to separate at least one volatile, preferably gaseous substance at least partially from a liquid phase. Here, all the precipitators and condensers known to the person skilled in the art of chemical technology are preferred. In the following, a "gas-liquid separation unit" is also referred to as "separation unit" or as "separator".

The volume of the gas-liquid separation unit is preferably from 2 ml to 150 ml, more preferably from 10 ml to 70 ml. It is particularly preferable for the dead volume to be kept as small as possible.

At the bottom of the gas-liquid separation unit, there is preferable a liquid outlet means, preferably a valve and more preferably an automatically controlled valve. The liquid outlet means preferably leads to liquid recovery on the output side. Here, for example, "recovery" means disposal, reprocessing or analysis.

The at least one unit for fluid-fluid separation, preferably gas-liquid separation of the device according to the present invention is preferably positioned on the high pressure end of the device, further preferably downstream of the exit side of the reactor. Reference is made, for example, to FIG. 5. Such a separator is preferably used if the product fluid flow contains both liquid and gaseous components.

The term "product fluid flow" in the meaning of the present invention relates to the fluid flow that emanates from the reaction space and may also contain portions of unreacted educt. Furthermore, the expression "product fluid" comprises all liquid components that are collected in the separator. Liquid components may also be, depending on the reaction conditions, liquid educt components.

In a further embodiment of the present invention that is particularly concerned with separating components of product fluid in separation units, the device according to the invention for investigating catalysts has been modified in a way, so that the processing of product fluids is accomplished automatically by means of a controlling and regulating unit in communication with a computer, wherein both are in data communication with the device according to the invention. In a preferred embodiment, the separating units (separators) are equipped with fluid level sensors that are capable of determining the fluid level in the separator with respect to the product fluid. Furthermore, said sensor is able to relay said information to the computing and/or controlling unit. In addition, not only is the fluid level sensor connected to the computer, but also the discharge valve of the separator. Thereby, said discharge valve can be controlled and regulated in an automated manner.

In a further preferred embodiment, a fluid level sensor is sufficient that indicates a certain (predetermined) level of the product fluid to be determined within the separator. Said predetermined filling level may be determined in experiments involving opening the separator and positioning the sensor before the eventual experiment.

Suitable sensing elements are in particular those elements that are based on measuring the capacitance and/or a resistance. Suitable sensors for determining the fluid level within a separator are all sensors that enable a sufficient resolution with respect to position. A sufficient resolution with respect to position is achieved if the sensor reliably reacts to a change in fluid level that corresponds to 10% of the overall height of the container. Given standard container height, the triggering level for a sensor response lies in the area of a fraction of 1 mm up to 10 mm. As measuring processes to be used for the sensors according to the invention, the following processes are suitable: capacitative, capacitative under change of the dielectric loss; thermal conductivity under sensing by a thermocouple; any method on resistance; optical measurements by means of a reflecting light barrier or measuring of the change in reflection. Further suitable methods include sensors in floating bodies using optical, electrical or inductive sensing, dampening of mechanical oscillators, wherein the latter can be formed as a tuning forks or as oscillating discs.

Once the predetermined amount of product fluid is reached within the separator, a sensor signal of the fluid level-sensor is relayed to the computer control. Said computer control opens the discharge valve that is located at the bottom side of the separator. By means of opening said discharge valve, a fluid connection between the high pressure end and the low pressure end of the apparatus for testing the catalyst is established. Based on this differential in pressure, the product fluid is pushed out of the separation unit, via the connection containing the discharge valve, into the low pressure end of the device.

After the product fluid has been completely discharged out of the separation unit (due to the pressure differential), a jump in process parameters occurs on the high pressure end of the device. Said jump in process parameters may lead to an increase in gas flow and/or in a change in pressure within the high pressure end of the overall device. If the reaction is conducted under the condition of a constant gas flow, the pressure will drop in a jump-like manner as soon as all product fluid is pushed out of the high pressure end separator. If the reactions are performed under the conditions of constant pressure, the gas-flow will increase in an jump-like manner as soon as all liquid product is pushed out of the high pressure end separator.

Both the jump-like change in pressure as well as the jump-like change of gas flow are preferred process parameters that are used to control and regulate the discharge valve located on the bottom side of the high pressure end separator. In the method according to the invention, these process parameters are used to close the discharge valve that provides the fluid connection between the high pressure end separator and the low pressure end of the overall device. The time period in which the change of pressure or of fluid flow within the unit occurs is very small and will therefore hardly lead to any disturbance of the catalytic reactions within the reaction space(s).

It is preferred, that for detecting a change in one of these process parameters, the magnitude of said value is not used directly, but rather the derivative with respect to time. This facilitates the detection of possible changes.

The viscosity of gaseous components is smaller by a factor of 1,000 than the viscosity of liquids that show a Newton-type behavior. This difference in viscosity between product liquid and product gas leads to jump-like changes of process parameters. Herein, changes in process parameters are used as a control signal for closing the discharge valve of the separator.

In a preferred embodiment of the overall unit for studying catalysis, the low pressure end collecting area for product fluid is formed by an additional separation unit, namely the low pressure end separation unit. This embodiment is particularly preferred in case the product fluid is to be cooled in steps, and the temperature of the low pressure end collecting area is supposed to be lower than the temperature of the high pressure end separator. In this case, further product liquid may be separated from the product fluid on the low pressure end of the unit. At the bottom side of the low pressure end separating unit, discharging valves are positioned. These discharge valves are used to collect fluid products and to direct those products, in a preferred embodiment, to an online system of analysis or to product collecting containers.

The design and composition of the separator on the low pressure end of the unit corresponds, in principle, to the design and configuration of the separator on the high pressure end. The product fluid, preferably the gaseous product, is directed from the separator on the high pressure end, via a connection containing restrictor element, into the separator on the low pressure end. The charging of said product into the low pressure end separator is preferably accomplished by means of a dip pipe or a tube. Even after a small amount of product liquid has been separated, the gaseous product fluid that enters the separator by means of said dip pipe or tube bubbles through the product liquid. Thereby, the efficiency of stripping gaseous component out of the product liquid is improved.

Under certain circumstances of operating the method according to the invention, it is advantageous if the flow of holding gas is considerably greater than the flow of the educt gas. "Considerably" means at least a factor of about 10. The inner diameter of the restrictor elements is to be adapted to the holding gas flow. In case of a higher holding gas flow, it is advantageous to use a larger diameter for the restrictor elements. As a further advantage, a higher holding gas flow improves flow conditions for reactions in which large changes in viscosity of the reaction gases occurs. In this case, the viscosity of the overall gaseous product fluid is determined by viscosity of the holding gas. By way of example, reference is made to reactions in which the hydrogen content changes drastically during the reaction. This leads to a significant change in viscosity during reaction. By applying a high holding gas flow in the first place, such changes in viscosity can be compensated for.

With respect to the design of the low pressure end separator, it is noted that said separators preferably contain a so-called dip pipe or tube. Said dip pipe or tube directly introduces the product fluid flow into the product liquid as soon as a small amount of liquid is present in the separator. By means of flowing or bubbling the gaseous fluid into the product liquid, a bulk of the gaseous component that is still dissolved in the liquid is stripped out of the liquid. By means of introducing, preferably additionally, an inert gas into the product fluid stream, the efficiency of the stripping process can be further enhanced.

The shape of the separators is preferably in the form of a cylinder due to a cylinder's improved performance with respect to holding up to pressure. The bottom side of said separators is preferably funnel-shaped. This ensures a quick and complete discharging of fluid over the discharge valve that is positioned at the tip of said funnel.

The method according to the invention is used, in a preferred embodiment, for discharging product liquids from separators that have a liquid volume ranging from 0.1 ml to 140 ml. Further preferred said volume ranges from 0.5 ml to 60 ml. Furthermore, the method according to the invention for discharging product fluid out of separators is used for liquid volumes ranging from 1 ml to 30 ml.

While performing the method according to the invention, it is possible that small amounts of product fluid remain on the inner walls of the separator in the form of a thin film even after completely discharging said separator. The remaining of a thin film of product liquid on the inner walls of the separator is one of the factors that governs the degree of precision that can be reached for the method of discharging product liquid out of separators. An additional factor is given by the experimental conditions. Preferably, the rate of separation of product liquid within the separator should be considerably lower than the rate at which the separator is discharged, i.e. the product liquid is emptied out of the separator.

For example, in case of a metal cylinder of 100 ml, 100 mg of liquid filling remain (assuming that 50 g have been filled in the first place) in the case of water and about 30 mg in the case of hydrocarbons. In any case, wetting and pre-treatment of the inner surface play a decisive role and determine if the liquid runs off as a film or if the film ruptures and possibly drops remain hanging on the walls.

By using suitable experimental conditions, the degree of precision to be achieved using the method according to the invention is mostly determined by the remaining amount of product liquid on the walls in case the product liquid does form films. Generally, the amount of product liquid that remains as a film on the inner walls of the separator is less than about 5% by weight in relation to the total amount of product liquid that has been removed from the separator. It is possible to operate the method and to design the device in a manner so that the loss of product liquid is less than 1% by weight in respect to the total amount of product liquid that is being removed from the separator. In preferred embodiments of the device, it is possible to improve the method to an extent so that possible loss of product fluid by means of forming films on the inner walls of the separator is less than 0.1% by weight.

Preferably, these values are achieved by choosing the material and/or treating the surface of the inner walls of the separator so that adhesion of product fluid to the wall is minimized or excluded.

The use of the method according to the invention for discharging separators is suited for conventional catalysis apparatuses that contain only one reaction space (reactor) as well as for catalysis systems for high throughput testing comprising a plurality or multitude of reaction spaces in parallel. On the high pressure end of the overall system, usually at least one separator is present per reaction space. On the low pressure end, the number of separators used is to be adapted to the intended use of each specific embodiment of the overall unit. Thereby, it is possible to direct the product liquids, by means of an automated control unit, to an online system of analysis, or it is possible to firstly direct the product fluids into collecting containers for storage and to perform the analytical analysis at a later point. Therein, it is possible it perform analysis by all methods that have been mentioned before or that are known to the person skilled in the art.

The device according to the invention and the method according to the invention for processing product liquids are extremely flexible with respect to its use in apparatuses for catalysis and they offer a larger range of advantages over the methods known the prior art. Among these advantages are: simple implementation in the field of constructing high throughput systems that are used to investigate a plurality of catalysts in parallel. Furthermore, the present invention is particularly suited for performing kinetics investigations in which the reaction products are investigated over longer periods of time in an automated manner. In these studies, aging of the catalysts and long-term stability of the catalysts is determined. By almost completely emptying the test liquid out of the separator in comparatively short time interval, a kind of in situ cleaning of the inner walls of the separator during testing the catalysts is performed. This results in a high sensitivity with respect to chemical changes of the catalytic reactions investigated.

By way of example, investigating catalysts for the method of so-called "hydro-treating" are referenced. Said hydro-treating is used for removing sulfur out of hydrocarbon components. Therein, the sulfur bound to the hydrocarbon components is reduced to hydrogen-sulfide by hydrogen. Finding a small amount of sulfur concentrations within the liquid reaction products is a critical point for testing catalysts. In addition, the concentration of sulfur changes with time, so that analysis of the product liquids in short time intervals is of particular interest. By using the method according to the invention and by using the device according to the invention, it is possible to determine the catalytic properties of catalysts within a shorter period of time and with a higher degree of sensitivity compared to the methods known from the prior art.

In an alternative embodiment, it is possible to modify the described method of discharging the separator by implementing an automatically controlled valve in the connection between the exit of the reaction space and the inlet into the high pressure end separator. The sensor signal which indicates the target filling level of valve is used to close the valve between reaction space exit and inlet into the separator; successively the bottom valve of said separator is opened. The opening of the bottom discharge valve could be controlled by a time trigger. The opening time should be long enough, so that all product liquid is transferred to the low pressure end, preferably into at least one collecting area. The pressure inside the separator that has been closed by means of closing the valve is high enough to allow for a transfer of all the liquid sample from the high pressure end to the low pressure end. After closing the bottom (discharge) valve, the valve between reaction space and inlet side of the separator is opened.

The advantage of having such a valve (as a restrictor) is that pressure changes or small changes due to the large quantity of gas flowing through the valve at the bottom may be suppressed to a certain extent.

All the components/elements used in the device according to the invention may optionally be cooled or heated. Appropriate temperature control elements (heater/cooler) are provided for this. There are no restrictions relating to the choice of temperature control elements, that is to say the elements which measuring a temperature and operate a heater/cooler via a control loop, where appropriate in order to reach a predetermined setpoint value. With respect to the heating of parallel reactors, the relevant disclosure of US 2003/0159530 is to be fully incorporated here.

In the present case, it is preferable for there to be different temperature zones in the device according to the invention. This means, in particular, that each individual element of the device according to the invention, as indicated below in the list of references, may be in a different temperature zone relative to each other element of the device, as indicated in the list of references.

Regarding the reaction space, it is preferable for the reaction space output regions and the reaction space input regions to be at a lower temperature than the actual (hot) reaction zone inside a reaction space. This temperature profile leads to less thermal loading on the reaction space input and output sides, and it is possible to use standard fittings and standard seals for fitting the connections according to the invention, for example to the educt and holding gas feeds.

In this case, it is furthermore essential and preferable that sets of restrictors (on the reaction space output and input sides, belonging to the control fluid feed, etc.) to be respectively at the same temperature. This is particularly essential since the functionality of restrictors depends strongly on the physical properties of the fluids flowing them. These physical properties of the fluids, and in particular their viscosity and their volume flow, may depend greatly on the temperature. Different temperatures in different restrictors therefore lead to different pressure drops, and therefore compromise the comparability of the reactions.

It is particularly preferable for sets of restrictors to be at the same temperature within the set but at different temperatures vis-à-vis other sets. Here, an "equal" temperature means that the temperature should not vary by more than +/−5 K, preferably no more than +/−1 K.

In a preferred embodiment, the analysis unit is located downstream (in terms of the product flow) of the aforementioned restrictors on the reaction space output side, more preferably downstream of at least one multi-port valve, also described above. There are in principle no restrictions relating to the analysis methods which are used in the analysis unit. Infrared thermography—preferably in combination with mass spectroscopy, mass spectroscopy, GC, LC, HPLC, micro-GC, dispersive FT-IR spectroscopy, Raman spectroscopy, NIR, UV, UV-VIS, NMR, GC-MS, infrared thermography/Raman spectroscopy, infrared thermography/dispersive FT-IR spectroscopy, color detection by chemical indicator/MS, color detection by chemical indicator/GC-MS, color detection by chemical indicator/dispersive FT-IR spectroscopy, and photoacoustic analysis, as well as any combination of the aforementioned analysis methods, are preferred.

An analysis unit according to the invention is preferably used together with one or more multi-port valve(s). Selected embodiments of the device according to the invention will be explained by way of example below with reference to schematic diagrams, in which.

Figure 1:
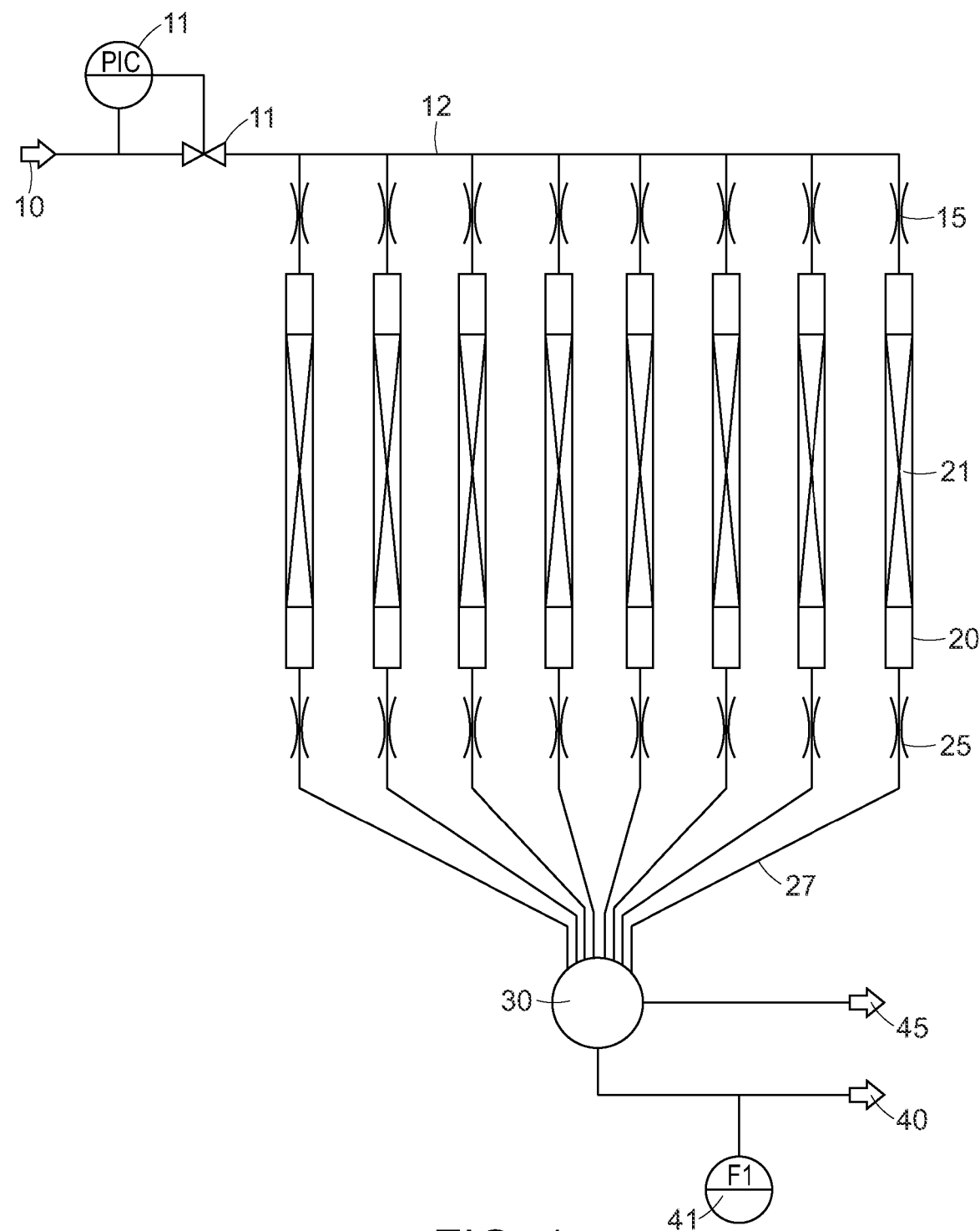
FIG. 1 shows a schematic diagram of a device for the parallel testing of chemical reactions, in particular catalysts, as is known per se from the prior art.

FIG. 1 shows a schematic diagram of a device for the parallel testing of chemical reactions, in particular using catalysts, as is already known per se from the prior art. An educe fluid, for example an educt gas, is in this case fed from a supply unit (10) via a pressure controller (11), here embodied as a pressure meter with feedback to a valve, into a manifold of connections (12) which in the present case constitutes the educt feed common to all the reaction spaces.

A plurality of restrictors (15) are provided on the input side of the (here eight) reaction spaces (20), and as part of the connections from the said reaction spaces to the common educt gas feed (12), specifically just one restrictor per connection to the input of a reaction space.

In the present case, there is a catalyst bed (21) in the reaction space.

On the reaction space output side, the products which respectively flow out of the reaction spaces are conveyed via connections (27) to a multi-port valve (30). Each of the connections contains a restrictor (25) on the reaction space output side. In total, therefore, there is a plurality of eight restrictors. If two sets of restrictors are used, as in the present case, specifically one before the reaction spaces and one after them, then the restrictors on the reaction space input side are preferably used for equidistribution of the educt fluid, whereas the restrictors on the reaction space output side relax the product flows from the reactor pressure to a pressure suitable for the multi-port valve, typically ambient pressure.

The multi-port valve selectively connects the product flows from the reaction spaces to an outlet line (45) for discharge or an outlet line to the analysis unit (40). The analysis unit is preceded by a flow meter (41).

Figure 2:
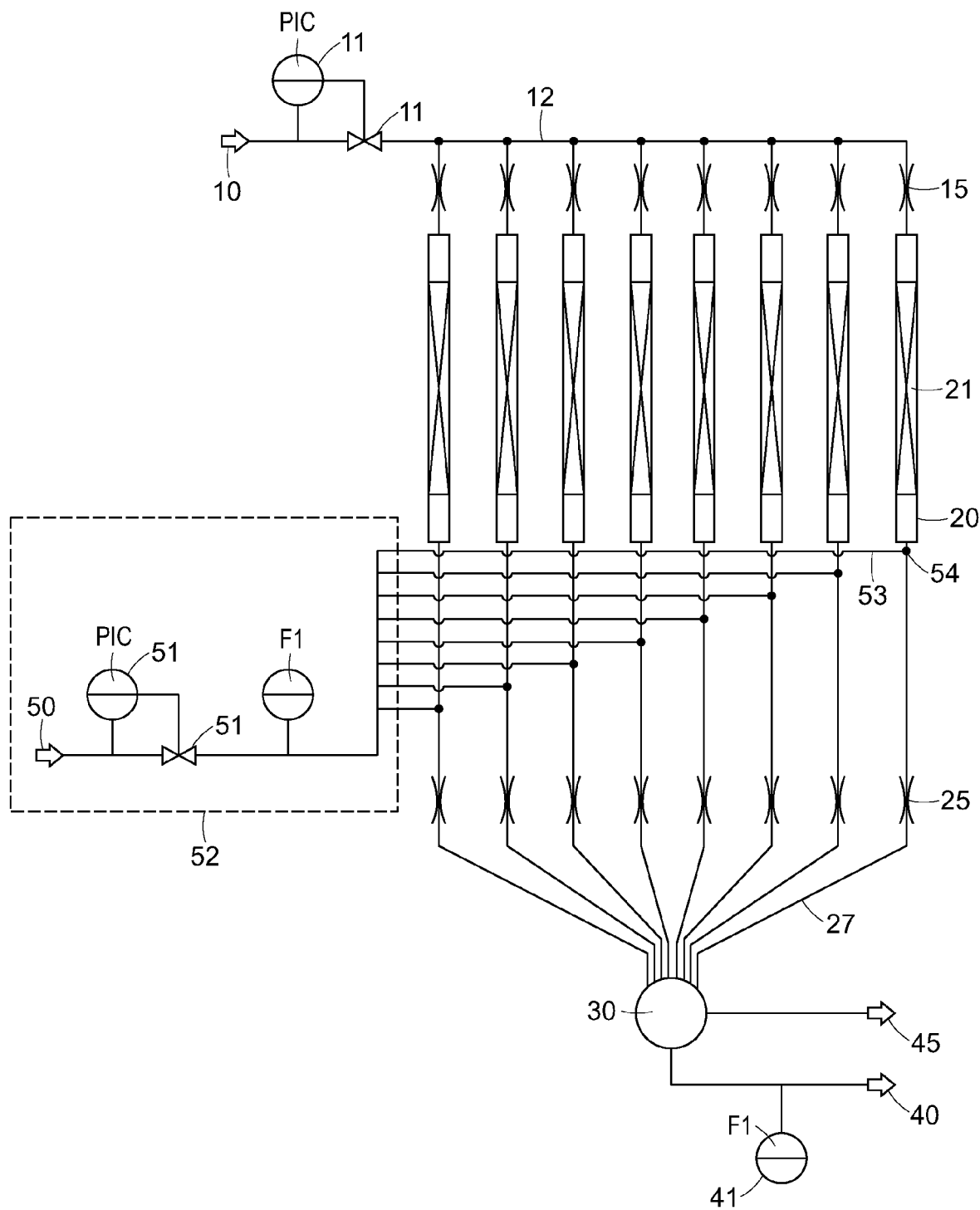
FIG. 2 shows a schematic diagram of an embodiment of a device according to the present invention, comprising a holding gas feed.

FIG. 2 shows a schematic diagram of an embodiment of a device according to the present invention which, in contrast to the prior art, has a holding gas feed (52) common to all the reaction spaces. This holding gas feed, the basic outline of which is indicated by dashed boxes, in the present case comprises a supply unit (50) for the holding gas and a pressure controller (51) for the holding gas.

The common holding gas feed branches into as many connections (53) to the reaction spaces as there are reaction spaces, that is to say eight in the present case. These connections (53) respectively come together with the connections (27) from the reaction spaces (20) to the multi-port valve (30) at a node/mixing point (54). Each of these nodes is upstream of the restrictors (25), that is to say upstream in the flow direction of the product flows leaving the reaction spaces.

The other components of the device according to the invention, as indicated here by way of example, correspond in terms of function and references to the components described in FIG. 1.

Figure 3:
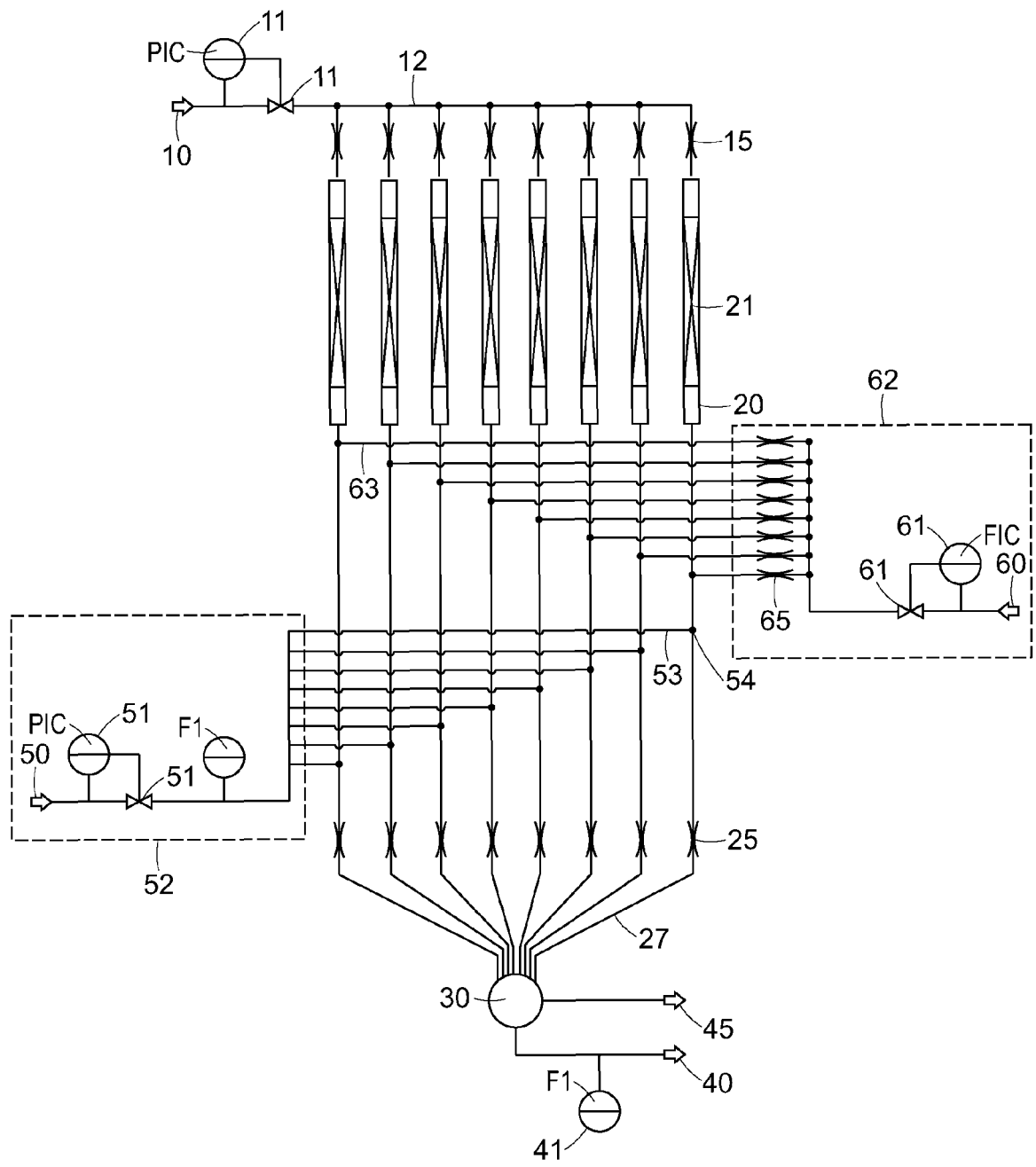
FIG. 3 shows a schematic diagram of an embodiment of a device according to the present invention, comprising a holding gas feed and a control fluid feed.

FIG. 3 shows a schematic diagram of an embodiment of a device according to the present invention, comprising a holding gas feed (52) and also a control fluid feed (62). This control fluid feed (62) in the present case likewise comprises a supply unit (60) for the control fluid and a mass flow controller (61) for the control fluid.

The common control fluid feed branches into as many connections (63) to the reaction spaces as there are reaction spaces, that is to say eight in the present case. These connections respectively come together with the connections (27) from the reaction spaces (20) to the multi-port valve (30) at a node/mixing point. Each of these nodes is upstream of the restrictors (25), that is to say upstream in the flow direction of the product flows leaving the reaction spaces. In the present case, these nodes are also upstream (in the sense just defined) of the nodes (54) of the common holding gas feed. In the context of the present invention, the nodes for the control fluid feed may also coincide with the nodes (54).

What is essential for the functionality of the control fluid feed is that the flow of the control fluid, coming from the supply unit for the control fluid, is distributed into maximally equal portions over the (here eight) connections which finally meet the flows to be controlled from the reaction spaces. This equidistribution is brought about by the restrictors of the control fluid feed (65), which are part of the connections (63) in the present case. Here, there is respectively one restrictor (63) per reaction space.

The other components of the device according to the invention, as indicated here by way of example, correspond in terms of function and references to the components described in FIG. 2.

Figure 4:
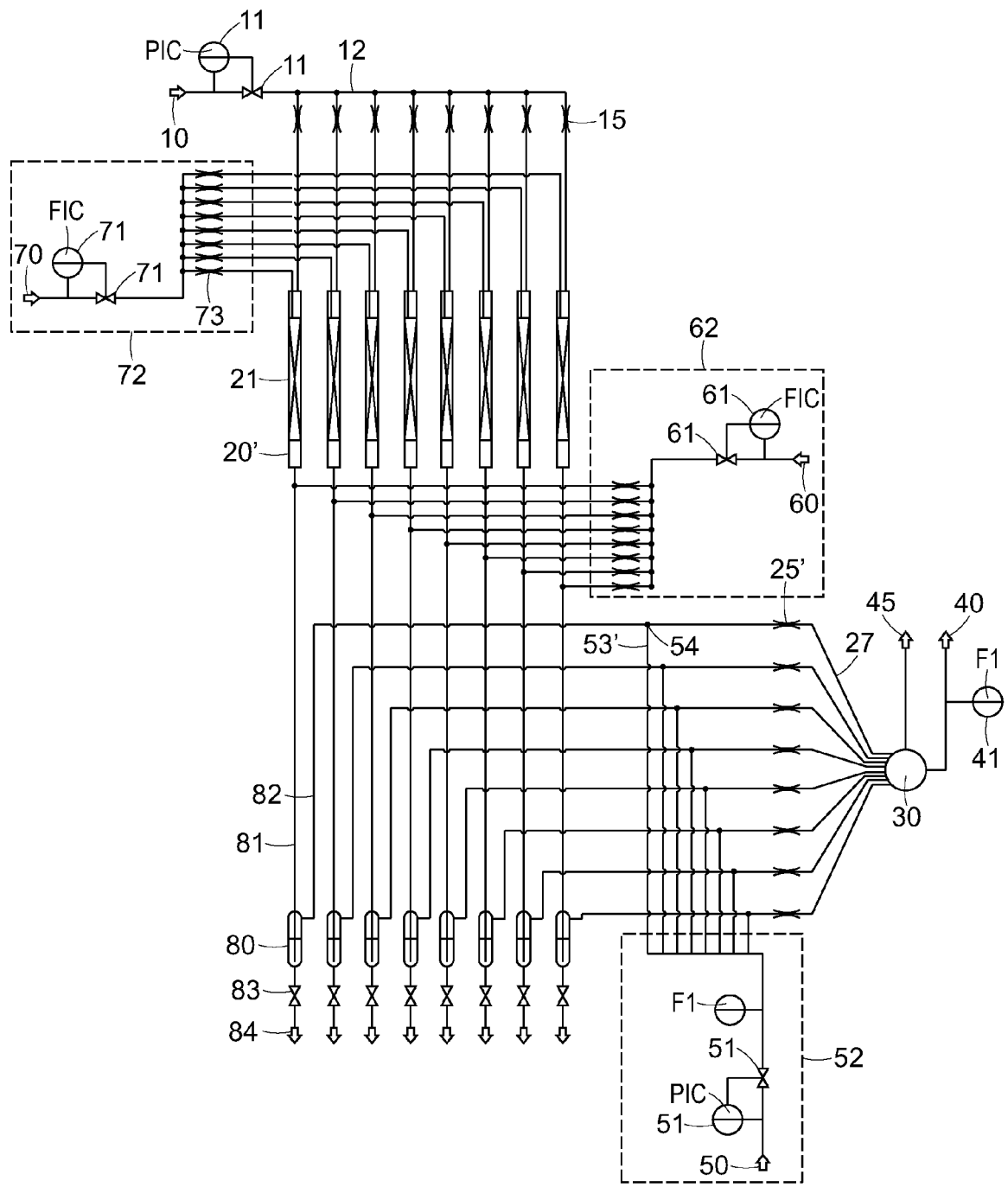
FIG. 4 shows a schematic diagram of an embodiment of a device according to the present invention, comprising a holding gas feed, a control fluid feed and a liquid input in parallel with the educt feed, with liquid-gas separation on the reaction space output side.

FIG. 4 shows a schematic diagram of an embodiment of a device according to the present invention, comprising a holding gas feed (52), a control fluid feed (62) and a common educt liquid feed (72) in parallel with the educt feed (12), with liquid-gas separation units (80) on the reaction space output side.

In contrast to the embodiments described above, on the reaction space input side in parallel with the common educt feed (12) in this embodiment, there is an educt liquid feed (72) common to all the reaction spaces. In the present case, this comprises a supply unit (70) for educt liquid and a mass flow controller (71) for educt liquid. In respect of the educt liquid, the distribution into eight equal flows is also achieved by restrictors (73) which precede the eight inputs to the reaction spaces.

The reaction spaces are designed as gas-liquid-solid reactors (20') in this embodiment, that is to say the educt liquid from (70) is introduced onto a solid catalyst bed (21) and the educt, here a gas, is simultaneously fed in from (10). There is a liquid phase as well as a gas phase as the reaction product in this case, and the liquid phase may contain partially dissolved gas. In any event, gas-liquid separation is therefore necessary.

The product flows from the eight reaction spaces are consequently introduced via connections (81) into eight gas-liquid separation units (80) (precipitators). There, the liquid can be discharged through a valve (83) and optionally reprocessed. The reaction gas released from the liquid is fed to the analysis unit via the reaction gas outlet line (82).

Holding gas from the common holding gas feed (52) is also fed through this product gas outlet line (82), and specifically via connections (53'). In this arrangement, the holding gas not only compensates for volume fluctuations in the reaction spaces, as in the embodiments described above, but optionally also stabilizes the viscosity of the product gas so that the restrictors (25') which precede the feed to the analysis unit (40) [with a multi-port valve (30)] can act as they are intended. It should furthermore be noted that the control fluid feed (62) in this arrangement is not only used to control the flows through the reaction spaces, as in the embodiments described above, but can also act as a strip gas if a gas is being used as the control fluid, that is to it can say assist the gas-liquid separation at (80).

The other components of the device according to the invention, as indicated here by way of example, correspond in terms of function and references to the components described in FIG. 3.

Figure 5:
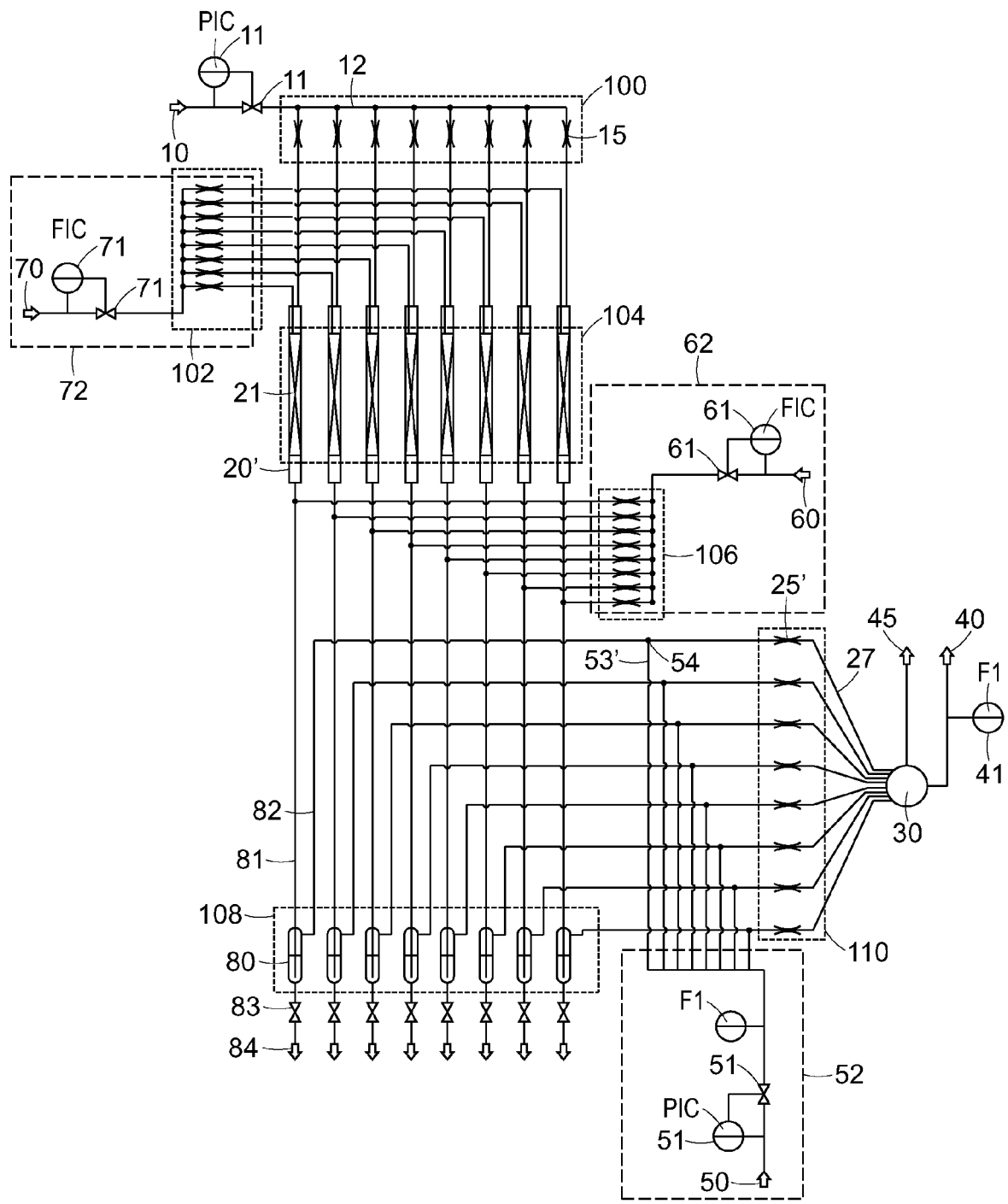
FIG. 5 shows a schematic diagram of the same embodiment as in FIG. 4, but with regions of different temperature also indicated.

FIG. 5 shows the same embodiment as FIG. 4 in a schematic diagram, but with regions of different temperature also indicated by dots. Restrictors are respectively provided as sets in the context of the device according to the invention, each of which fulfils the same function. For example, the dotted box (100) groups together all the restrictors which belong to the common educt feed on the reaction space input side. These restrictors should be kept at a separately controlled temperature, which may be adjusted with particular accuracy but in any event is as constant as possible. In this way, it is possible to ensure that the pressure drop is the same or similar in all the restrictors in the device according to the invention, so that the flows are also equal or similar.

The same applies to the restrictors (102) of the educt liquid feed, the restrictors (106) of the control fluid feed and the restrictors (110) on the product gas outlet side. In this case, the sets of restrictors may very well be at different temperatures vis-à-vis other sets of restrictors.

Besides the sets of restrictors, the reaction spaces (20') are in particular also subject to their own temperature control, which may optionally comprise heating and cooling here. According to the invention, the reaction zone (104) is then at a significantly higher temperature, namely the reaction temperature for at least some of the time, than the input and the output of the reaction spaces. This has the advantage that cost-effective standard fittings can optionally be used at the input and output.

Lastly, the separate temperature zone (108) for the precipitators is also to be mentioned, which should typically be significantly colder than the reaction region in order to promote the gas-liquid separation. Accordingly, the zone (108) will be heated somewhat less strongly. In this case, it is preferable for the zone (108) to be kept colder than the zone (110) of the restrictors on the reaction gas outlet side.

The other components of the device according to the invention, as indicated here by way of example, correspond in terms of function and references to the components described in FIG. 4.

Figure 6:
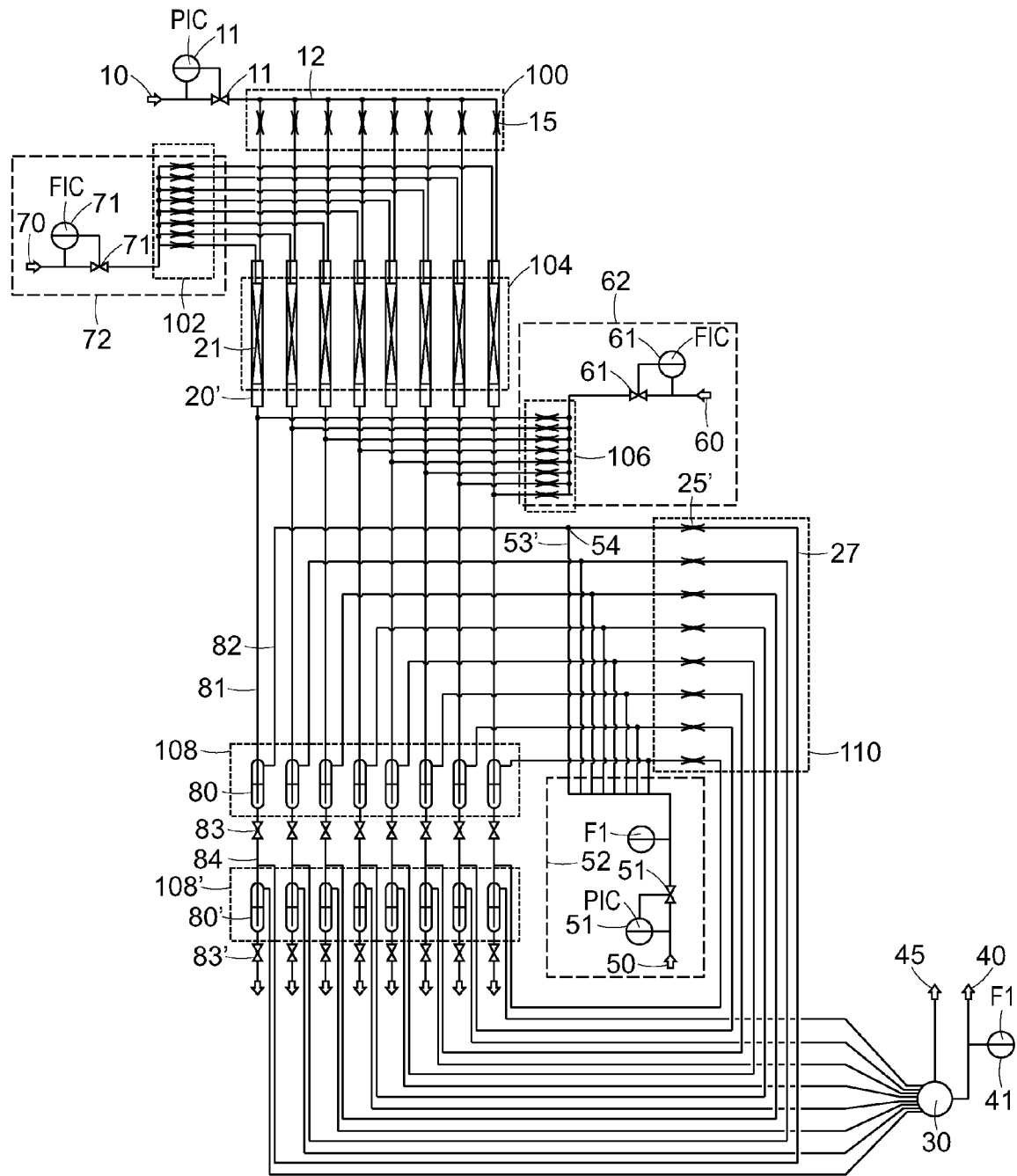
FIG. 6 shows a schematic diagram corresponding to the embodiment of FIG. 5, with the exception that the fluid separation units are supplemented on the low pressure side by a further group of fluid separation units.

FIG. 6 schematically shows the same embodiment as FIG. 5, with the exception that the fluid separation system is supplemented, on the low pressure side, by another group of fluid separation units (80'). Depending on the specific implementation of the overall device, it may be advantageous to provide a group of units for fluid separation (80') on the low pressure side in addition to the separators (80) on the high pressure side. In a preferred embodiment, the temperature of zone 108' on the low pressure side will be selected so that it is significantly lower than the temperature of the high pressure zone 108.

By selecting suitable processing conditions, it is possible to achieve, on the low pressure side, the separation of products, that were not able to be separated by means of gas-liquid separation on the high pressure side. Further technical advantages of using low pressure side units for gas-liquid separation results from the greater distance to the heated reactor units. The product fluid flow can therefore be cooled more effectively on the (longer) way to the low pressure end units for gas-liquid separation.

Figure 7:
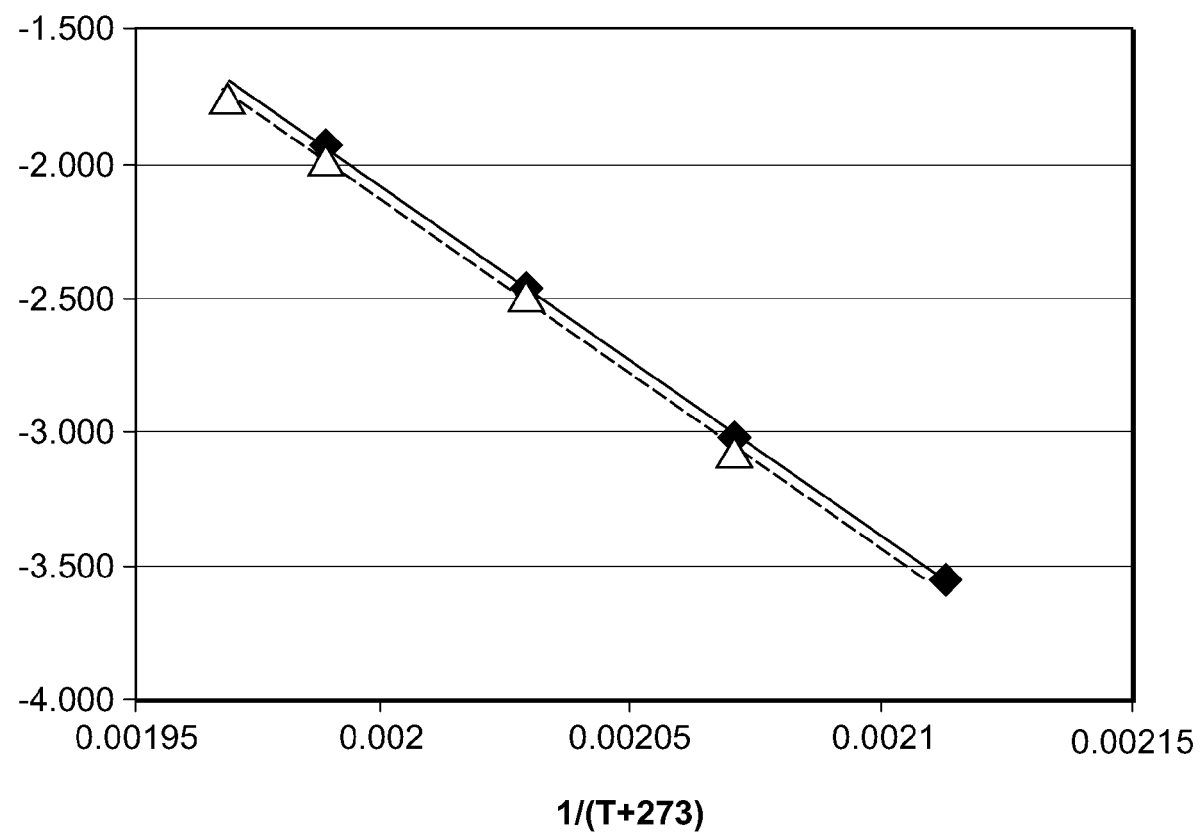
FIG. 7 shows the natural logarithm of the space-time yield as a function of the inverse temperature for a reaction according to an exemplary embodiment.
Figure 8:
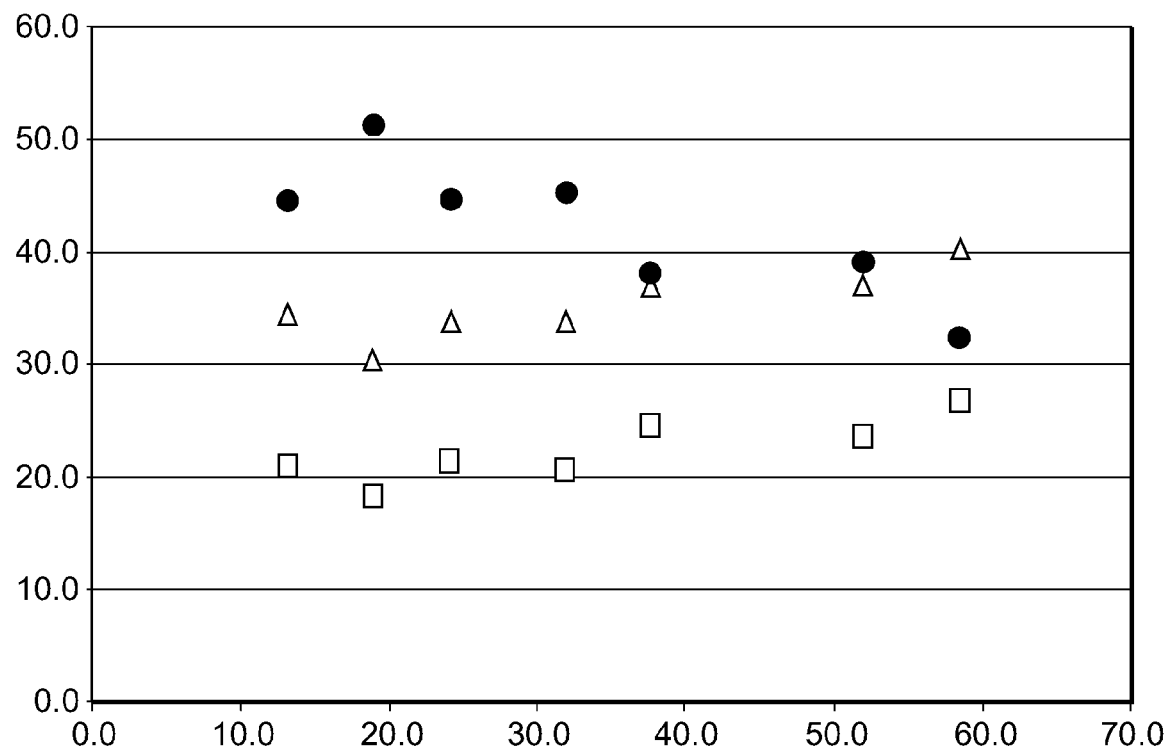
FIG. 8 shows the product selectivity for different hydrocarbons, as a function of the CO conversion (for the exemplary embodiment).
Figure 9:
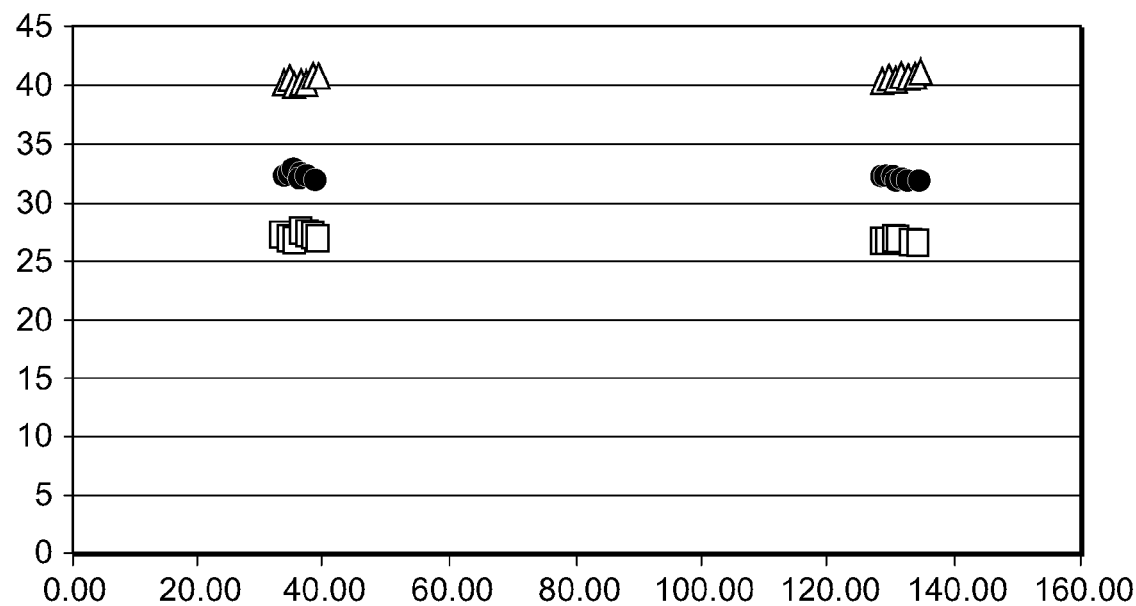
FIG. 9 shows the hydrocarbon selectivities as a function of the residence time (for the exemplary embodiment).

FIGS. 7 to 9 will be explained in more detail in the exemplary embodiment given below.

LIST OF REFERENCES FOR THE FIGURES

(10) supply unit for educt
(11) pressure controller for educt
(12) common educt feed
(15) restrictors on the reaction space input side
(20) reaction space
(20') gas-liquid-solid reactor
(21) substance (catalyst bed) in reaction space
(25) restrictors on the reaction space output side
(25') restrictors on the reaction gas outlet side
(27) connection (reaction space—restrictor—multi-port valve)
(30) multi-port valve
(40) outlet to the analysis unit
(41) flow meter
(45) outlet to discharge instrument
(50) supply unit for holding gas
(51) pressure controller for holding gas
(52) common holding gas feed
(53) connection (holding gas feed—reaction spaces)
(53') connection (holding gas feed—reaction gas outlet line)
(54) node/mixing point
(60) supply unit for control liquid
(61) pressure controller for control fluid
(62) common control fluid feed
(63) connection (control fluid feed—reaction spaces)
(65) restrictors of the control fluid feed
(70) supply unit for educt liquid
(71) pressure controller for educt liquid
(72) common educt liquid feed
(73) restrictors of the educt liquid feed
(80) gas-liquid separation unit (high pressure side)
(80') gas-liquid separation unit (low pressure side)
(81) connection (reaction space—gas-liquid separation)
(82) reaction gas outlet line
(83) liquid outlet means (high pressure side)
(83') liquid outlet means (low pressure side)
(84) outlet line to the liquid recovery
(100-110) zones of separately controlled temperature The exemplary embodiment indicated below is intended to illustrate the device according to the invention using liquid-gas separation units (precipitators) downstream of the reaction spaces, and the associated method, by way of example and for selected embodiments. The special indications given by way example are not in any way intended to restrict the general disclosure of the present invention, as it is indicated in the description.

The exemplary embodiment relates to the determination of activity, activation energy and product selectivity for the conversion of synthesis gas into hydrocarbons by using Fisher-Tropsch synthesis (FTS) catalysts in parallelized reaction spaces of a device according to the invention. Here, it is demonstrated that the pressure, flow and temperature are controlled under Fisher-Tropsch synthesis conditions in parallelized reaction spaces, and that technical reaction quantities such as catalyst activity, activation energy and product selectivity can be determined.

In Fisher-Tropsch synthesis (FTS), synthesis gas consisting of CO and $H_2$ is converted on heterogeneous catalysts into hydrocarbons with carbon numbers in the range of from $C_1$ (methane) to $C_{60}$. The ratio of $H_2$ to CO in the synthesis gas is in the range of from 0.5 to 2.5, and depends essentially on the production method and the raw material sources available.

Typical catalysts for FTS contain, for example, iron or cobalt as the active element, oxide support materials such as aluminum oxide or silicon oxide and promoters, which influence the reducibility of the active components or the kinetics and selectivity of the FTS.

Representative FTS catalysts, calcined at 300° C. for 3 hours in air, were heated at 1 K/min to 350° C. in a hydrogen-flushed solid bed reactor and reduced for 10 hours. The reactor was subsequently cooled in hydrogen to a temperature of less than 50° C. and passivated with air.

16 parallel reaction spaces of the test system according to the invention, which corresponds essentially to the device as shown in FIG. 4 (but without a parallel educt liquid feed) were subsequently filled with reduced and passivated catalysts. The catalyst bed consisted of a solid bed of 1 ml of the reduced passivated catalyst, homogeneously mixed in a volume ratio of 1:3 with $\alpha$-$Al_2O_3$ (inert material) annealed at 1200° C.

In order to activate the passivated catalysts, the 16-fold reactor was heated in hydrogen to 150° C. in 50 K steps and with holding times of 2 hours, specifically with a reaction pressure of 10 bar and a space velocity of 3000 h⁻¹ expressed in terms of volume. The reactor was subsequently heated to 240° C. in 10 K steps with holding times of 2 hours, and the catalysts were activated for 12 hours.

The reactor was then cooled to 180° C., and the FTS reaction conditions were set up, that is to say $H_2$/CO synthesis gas with 2 and 10 bar reactor pressures and a GHSV of about 2000 h⁻¹. The liquid and gaseous products were separated at 150° C. and reaction pressure in liquid precipitators. The volume contraction due to the synthesis gas reacting to form a liquid was compensated for by a holding gas. The composition and the gas flow of the gaseous products from the individual reactors were continuously determined quantitatively using process analyzers ($H_2$, CO, $CO_2$, total hydrocarbons) and a thermal mass flow meter at atmospheric pressure and 200° C. The composition of the hydrocarbons formed was also determined on-line by gas chromatography.

The liquid hydrocarbons were drawn off periodically from the precipitator through a bottom outlet valve, and weighed, after reaction times of between 50 and 100 hours of experimental time. 50-100 hours of experimental time were generally necessary in order to achieve a steady state with respect to synthesis gas conversion and hydrocarbon selectivities. Typical experimental conditions and results for the characterization of FTS catalysts in the 16-fold reaction are collated for one catalyst (for the sake of clarity) in Table 1.

TABLE 1 experimental conditions and results for the conversion of synthesis gas ($H_2$/CO) on a typical Fisher-Tropsch synthesis catalyst

| Example | Temperature °C. | Pressure bar | HSV h⁻¹ | Volume flow, stp L/h Syn gas | Strip gas | O conversion % | Space-time yield $G_c h^{-1} m L_{cat}^{-1}$ | Hydrocarbon Selectivity, C-% $C_1$-$C_4$ | $C_5$-$C_{12}$ | $C^{13+}$ |
|---|---|---|---|---|---|---|---|---|---|---|
| 1 | 200 | 10 | 2040 | 2.04 | 0 | 8.7  | 0.0291 | 12.8 | 21.6 | 65.6 |
| 2 | 210 | 10 | 1980 | 1.98 | 0 | 13.2 | 0.0433 | 21.0 | 34.5 | 44.5 |
| 3 | 220 | 10 | 2100 | 2.1  | 0 | 24.1 | 0.0862 | 21.5 | 33.8 | 47.4 |
| 4 | 230 | 10 | 2160 | 2.16 | 0 | 37.7 | 0.1467 | 24.6 | 37.2 | 38.2 |
| 5 | 220 | 10 | 1220 | 1.22 | 1 | 31.9 | 0.0850 | 20.8 | 33.9 | 45.3 |
| 6 | 230 | 10 | 1160 | 1.16 | 1 | 51.9 | 0.1406 | 23.7 | 37.1 | 39.2 |
| 7 | 235 | 10 | 1280 | 1.28 | 1 | 58.4 | 0.1732 | 26.9 | 40.5 | 32.6 |
| 8 | 210 | 10 | 1220 | 1.22 | 1 | 18.8 | 0.0469 | 18.3 | 30.4 | 51.3 |

Two series of experiments were carried out, in which the GHSV was altered by means of a control fluid feed and the reactor temperature was altered. The GHSV was about 2100 h⁻¹ in experiment series 1 (Examples 1-4) and about 1200 h⁻¹ in experiment series 2. The lower GHSV was obtained by feeding a constant strip gas flow (from the control fluid feed) to the product gas flow for control after the reactor. This reduced the educt gas volume flow for constant pressure/flow conditions (determined by the reaction space pressure and the dimensions of the capillaries).

In both series of experiments, the CO conversion and the space-time yield of the hydrocarbon products being formed increases as the temperature rises. If the two series of experiments with constant temperature are compared (Examples 3+4 with 5+6), it can be seen as expected that the conversion increases at the lower GHSVs, but the space-time yield remains constant.

In pertinent FIG. 7, the natural logarithm of the space-time yield (vertical y axis) is plotted as a measure of the reaction rate for both series of experiments as a function of the inverse temperature (1/T) (horizontal x axis) in a so-called "Arrhenius diagram".

It can be seen that the reaction rates as a function of temperature are the same for both series of experiments, and the activation energy as calculated from the slope of the lines is 107 kJ/mol.

Here, the solid line shows the results of Examples 1 to 4, whereas the broken line shows the results of Examples 5 to 8.

The product selectivities of the hydrocarbons being formed are also presented in Table 1 for both series of experiments, and are plotted in FIG. 8 as a function of the CO conversion. In FIG. 8, the product selectivity is indicated in % for the hydrocarbons (vertical y axis), specifically as a function of the CO conversion likewise in % (horizontal x axis). Here, the open squares represent the $C_1$ to $C_4$ hydrocarbons, the open triangles represent the $C_5$ to $C_{12}$ hydrocarbons and the filled circles represent the $C_{13}$ and higher hydrocarbons.

It can be seen that the product selectivities differ only little for the two series of experiments. With increasing CO conversion and temperature, the proportion of $C_{13+}$ hydrocarbons decreases whereas the proportion of $C_1$-$C_4$ gases and $C_5$-$C_{12}$ petroleum fractions increases. The selectivities collated in Table 1 correspond to the average values measured in the steady state.

Lastly, FIG. 9 shows the selectivity values for the hydrocarbons (in %, vertical y axis) for Example 7 as a function of the experimental time (in hours, horizontal x axis). It can be seen that the product selectivity does not change over very long periods of time, which is only possible if there are constant conditions of pressure, flow (GHSV) and temperature in the parallel reactors.

The conclusion from the discussion of Examples 1-8 is that technical reaction data (determination of the activity, activation energy and product selectivity) for the characterization of FTS catalysts can be determined with a very high accuracy by using parallel reactors. The flow, here measured as GHSV, can in particular be varied independently of the pressure while the reactions are being carried out.

The invention claimed is:

1. A method for the parallel conduct or study of at least two chemical reactions in at least two spatially separated reaction spaces, comprising:
   bringing at least one substance in at least two spatially separated reaction spaces in contact with at least one educt via at least one educt feed common to all the reaction spaces, or subsets of them; and
   simultaneously bringing at least one product flow from of the at least two spatially separated reaction spaces in contact with a holding gas from a holding gas feed common to all the reaction spaces, or subsets of them.

2. The method according to claim 1, further comprising simultaneously bringing the at least one product flow from of the at least two spatially separated reaction spaces in contact with a control fluid from a control fluid feed common to all the reaction spaces, or subsets of them.

3. The method according to claim 1, wherein at least one of the chemical reactions is not a constant volume reaction.

4. The method according to claim 1, wherein the educt flows are at least approximately distributed equally over all the reaction spaces by restrictors upstream of the reaction spaces, or by restrictors downstream of the reaction spaces, or by both.

5. The method according to claim 1, wherein volume fluctuations in the reaction spaces are reduced or compensated for by feeding an inert holding gas via at least one common holding gas feed.

6. The method according to claim 1, wherein in start-up operation before the at least one chemical reaction has taken place in the reaction spaces, the holding gas from the common holding gas feed is adjusted to a pressure which corresponds approximately to the intended pressure of the reaction spaces while the chemical reactions are taking place, and the educt flow from the common educt feed is subsequently adjusted so that educt flows into the reaction spaces from the common in educt feed.

7. The method according to claim 1, wherein the reaction space is loaded with at least one solid, the exposure of the solid to the educt being specified as GHSV in the event that the educt is a gas, or in LHSV units in the event that the educt is a liquid, and the GHSV is from $300\,h^{-1}$ to $10{,}000\,h^{-1}$ or the LHSV is from $0.2\,h^{-1}$ to $10\,h^{-1}$.

8. The method according to claim 1, wherein the pressure in the reaction spaces is in the range of from 2 to 200 bar.

9. The method according to claim 1, wherein a pressure drop of at least 10 bar is produced in the restrictors downstream of the reaction spaces in the flow direction.

10. The method according to claim 1, wherein a constant non-zero control fluid flow is a adjusted in start-up operation, and the flow of educt through the reactor is respectively reduced or increased by increasing or reducing this control fluid flow when the reaction is taking place, without the pressure in the reaction spaces being significantly affected by this.

11. A method for the parallel conduct or study of at least two chemical reactions in at least two spatially separated reaction spaces, comprising:
    bringing at least one substance per reaction space in at least two spatially separated reaction spaces in contact with at least one educt via at least one educt feed common to all the reaction spaces, or subsets of them, and with at least one educt liquid via at least one educt liquid feed common to all the reaction spaces, or subsets of them;
    simultaneously bringing the at least one reaction gas flowing out of each gas-liquid separation unit in contact with a holding gas from a holding gas feed common to all the gas-liquid separation units; and
    introducing the product flows flowing out of the reactor into at least one gas-liquid separation unit per reaction space.

12. The method according to claim 11, further comprising simultaneously bringing the at least one product flow from at least two spatially separated reaction spaces in contact with a control fluid from a control fluid feed common to all the reaction spaces.

13. The method according to claim 11, wherein the control fluid is a gas and that controls flows through the reaction spaces and contributes to stripping gases and volatile substances which may be dissolved in the liquid phases emerging from the reaction spaces in the gas-liquid separation unit.

* * * * *